United States Patent [19]

McLain, Jr. et al.

[11] Patent Number: 5,954,829
[45] Date of Patent: Sep. 21, 1999

[54] SYSTEM, METHOD, AND COMPUTER PROGRAM PRODUCT FOR DIGITAL CROSS CONNECT TESTING

[75] Inventors: John V. McLain, Jr., Colorado Springs, Colo.; Dale W. Harris, Jr., Richardson, Tex.

[73] Assignee: MCI Communications Corporation, Washington, D.C.

[21] Appl. No.: 08/774,650

[22] Filed: Dec. 30, 1996

[51] Int. Cl.$^6$ .................................................. G01R 31/28
[52] U.S. Cl. ............................................ 714/712; 370/241
[58] Field of Search ................................. 371/20.1, 20.4, 371/68.1, 68.2, 25.1; 395/182.02, 182.08, 183.01, 183.19, 185.09; 379/1, 12, 14, 15, 29; 714/712, 715, 820, 821, 736, 4, 10, 25, 43, 56; 364/229

[56] References Cited

U.S. PATENT DOCUMENTS

| | | | |
|---|---|---|---|
| 4,419,751 | 12/1983 | Cholat-Namy et al. | 370/241 |
| 4,455,602 | 6/1984 | Baxter, III et al. | 200/50.2 |
| 4,552,297 | 11/1985 | Belanger et al. | 227/120 |
| 4,575,797 | 3/1986 | Gruner et al. | 395/385 |
| 4,636,948 | 1/1987 | Gdaniec et al. | 364/300 |
| 4,737,985 | 4/1988 | De Luca et al. | 379/327 |
| 4,799,251 | 1/1989 | Smith et al. | 379/1 |
| 4,924,493 | 5/1990 | Dang et al. | 379/94 |
| 5,005,197 | 4/1991 | Parsons et al. | 379/210 |
| 5,008,812 | 4/1991 | Bhandarkar et al. | 364/200 |
| 5,027,343 | 6/1991 | Chan et al. | 370/250 |
| 5,095,505 | 3/1992 | Finucane et al. | 379/201 |
| 5,157,665 | 10/1992 | Fakraie-Fard et al. | 371/20.1 |
| 5,170,362 | 12/1992 | Greenberg et al. | 364/550 |
| 5,187,740 | 2/1993 | Swaim et al. | 379/209 |
| 5,197,127 | 3/1993 | Waclawsky et al. | 395/200 |

(List continued on next page.)

OTHER PUBLICATIONS

Martin, J. et al., "*TCP/IP Networking: Architecture, Administration, and Programming,*" PTR Prentice Hall, Englewood Cliffs, NJ, pp. 6–8 (1994).

Minoli, D., "*Telecommunications Technology Handbook,*" Artech House: Norwood, MA, chapter 3, pp. 101–168 (1991).

Peterson, J. et a., "*Introduction,*" Operating System Concepts, Second Edition, Addison–Wesley Publishing, U.S.A., pp. 1–15 (1986).

Palmer et al., "*Restoration in a Partitioned Multi–Bandwidth Cross–Connect Network,*" IEEE 1990 (pp. 81–85).

Tsukada et al., "The Multi–Project Support System Based on Multiplicity of Task," IEEE, 1994, pp. 358–363.

*Primary Examiner*—Trinh L. Tu

[57] ABSTRACT

A computer testing system, method, and computer program product is provided for testing one or more digital cross connect devices (DXCs) with one or more test and monitoring units (TMUs). A DXC test tool is coupled to each DXC and to each TMU. The DXC test tool sends a logical command or query to a DXC. A TMU tests the physical presence of the logical command directed to the DXC. The TMU sends a response to the DXC test tool indicating the state of the physical component. In this way, the DXC test tool tests each DXC in physical and logical dimensions. The DXC test tool can communicate over a plurality of communication links including fast channel links, human readable links, and remote control links. Routers are used to expand capacity. A single message display option for selecting between sending ASCII messages and sending binary messages. By connecting the DXC test tool to multiple DXCs, end-to-end path testing in physical and logical dimensions is performed. The DXC test tool also generates an analysis log of unexpected DXC and TMU responses. The analysis log and communication log are comprised of records having data fields so that a user can filter the logs. Timestamps further aid analysis. A scripting language is used that significantly reduces the number of lines required for a script. The scripting language uses repeatable commands and pointers that point to data tables. Multiple DXCs can be tested in parallel by running multiple scripts at the same time. The user-interface allows for interactive and dynamic script execution.

24 Claims, 18 Drawing Sheets

U.S. PATENT DOCUMENTS

| | | | |
|---|---|---|---|
| 5,222,120 | 6/1993 | McLeod et al. | 379/88 |
| 5,224,108 | 6/1993 | McDysan et al. | 370/522 |
| 5,226,041 | 7/1993 | Waclawsky et al. | 370/60 |
| 5,241,584 | 8/1993 | Hardy et al. | 379/67 |
| 5,276,440 | 1/1994 | Jolissaint et al. | 340/825.02 |
| 5,280,481 | 1/1994 | Chang et al. | 370/352 |
| 5,285,494 | 2/1994 | Sprecher et al. | 379/59 |
| 5,323,388 | 6/1994 | Chang et al. | 370/352 |
| 5,335,268 | 8/1994 | Kelly, Jr. et al. | 379/112 |
| 5,337,306 | 8/1994 | Hall | 370/249 |
| 5,343,461 | 8/1994 | Barton et al. | 370/249 |
| 5,355,405 | 10/1994 | Bernstein | 379/246 |
| 5,373,501 | 12/1994 | Roland | 370/250 |
| 5,375,126 | 12/1994 | Wallace | 370/20.1 |
| 5,375,159 | 12/1994 | Williams | 379/23 |
| 5,384,822 | 1/1995 | Brown et al. | 379/10 |
| 5,394,540 | 2/1995 | Barrington et al. | 395/500 |
| 5,396,616 | 3/1995 | Venable | 395/500 |
| 5,410,586 | 4/1995 | Davies | 379/14 |
| 5,414,858 | 5/1995 | Hoffman et al. | 395/725 |
| 5,435,003 | 7/1995 | Chng et al. | 395/575 |
| 5,438,528 | 8/1995 | Emerson et al. | 364/580 |
| 5,444,693 | 8/1995 | Arslan et al. | 370/221 |
| 5,481,548 | 1/1996 | Wallace | 371/20.1 |
| 5,487,073 | 1/1996 | Urien | 371/20.6 |
| 5,488,648 | 1/1996 | Womble | 375/13 |
| 5,490,272 | 2/1996 | Mathis et al. | 395/650 |
| 5,513,345 | 4/1996 | Sato et al. | 395/182.02 |
| 5,557,795 | 9/1996 | Venable | 395/650 |
| 5,563,930 | 10/1996 | Pester, III | 379/34 |
| 5,572,533 | 11/1996 | Sunada et a. | 371/20.1 |
| 5,572,570 | 11/1996 | Kuenzig | 379/1 |
| 5,594,792 | 1/1997 | Chouraki et al. | 379/269 |
| 5,600,632 | 2/1997 | Schulman | 370/252 |
| 5,636,345 | 6/1997 | Valdevit | 395/200.11 |
| 5,659,547 | 8/1997 | Scarr et al. | 395/182.02 |

SYSTEM, METHOD, AND COMPUTER PROGRAM PRODUCT FOR DIGITAL CROSS CONNECT TESTING

CROSS-REFERENCE TO RELATED APPLICATIONS

This patent application is related to the commonly-owned, U.S. utility patent application titled "Method and Apparatus for Simulating Multi-Tasking", U.S. Pat. No. 5,850,536 by John V. McLain, Jr., issued on Dec. 15, 1998 and incorporated by reference herein; and to the commonly-owned, co-pending U.S. utility patent application, titled "Method and System for Script Processing", U.S. Pat. No. 5,854,930 by John V. McLain, Jr. et al., filed concurrently herewith and incorporated by reference herein.

BACKGROUND OF THE INVENTION

1. Field of the Invention

The present invention pertains to a computer-implemented test tool.

2. Related Art Problem

Digital Cross Connects (DXC) are devices used in telecommunications networks to switch circuits by making internal logical connections between external physical ports. Cross-connects, disconnects, auditing, provisioning, and other actions are performed based on external commands issued by a control system.

DXCs are controlled by software, which is constantly being modified and upgraded to enhance the capabilities of DXCs. Each new software load must be tested prior to migrating into production. DXC testing is generally performed with a tool (computer) that emulates a control system by sending commands to the DXC and receiving responses from the DXC. The tool then reports results to user. Test scripts are commonly used to generate various commands in accordance with test scenarios.

Both physical and logical testing of DXCs are performed separately. Physical testing verifies that the electrical change of state that was requested of the DXC was actually performed. Logical testing verifies the actions imposed on the provisioned state of the DXC. Using both of these dimensions of testing, three types of tests are performed. Functionality testing is done by running a script once to test the functionality of the DXC. Stability testing is done by running a script multiple times to test the stability, in terms of predictability and repeatability, of the DXC. Stress testing is done by running multiple scripts over all resources to test the performance of the DXC under high volumes of transactions.

Since DXC software loads are frequent, a test tool is required that can be easily updated to test new functionality, stability, and stress requirements of DXCs. Current tools on the market perform the needed tests on DXCs, but have several limitations. Specifically, they:

Require extensive code in scripts. A typical script contains over 80,000 lines of code. This makes it difficult to update scripts for new software releases. For example, if a new release changes the syntax of a certain DXC command, each test script must be read line-by-line to change that command.

Allow only one script at a time, for a single DXC, to be executed. This inhibits the capability to perform stability and stress testing. It also prevents multiple DXC testing, such as setting up a multi-DXC circuit for end-to-end testing.

Support only a single RS-232 asynchronous interface for ASCII commands. This limits the throughput required for stress testing. It also limits the number of DXCs that can be tested to one, thus making it impossible to test end-to-end connections of multiple DXCs.

Provide no automated means for testing the logical responses received from a DXC against the actual physical action performed. If a DXC responds positively to a "cross connect" command, a user must manually test the cross connect to see if it was actually performed.

Provide no automated means for logically configuring the DXC. In order to perform meaningful tests, a test tool must place the DXC in a known logical configuration state. This requires the user to manually issue commands to the DXC to place it in a known state prior to testing.

Provide no automated means for performing analysis of test results. All messages passed between the test tool and the DXC are recorded in a communications trace log. After a test is performed, the user must read through this log, which will contain hundreds of thousands of records for a typical test scenario, to determine results.

Provide no means for remote control of the test tool. Users must have physical access to the tool to use it.

Provide no means for interactive and dynamic script execution.

What is needed is an advanced DXC Test Tool for fully testing one or more digital cross-connect devices. Improvements in DXC level and inter-DXC level testing are needed. At the DXC level, a test tool is needed which can test all DXC ports including ASCII ports and fast channel ports. A test tool is needed for performing DXC testing in both logical and physical dimensions. The logical and physical response of a DXC to different commands needs to be verified. Logical responses such as solicited and unsolicited communication messages from a DXC need to be tested. Actions imposed by a DXC on provisioned states need to be verified. Physical actions at the DXC electrical interface such as changes in physical connectivity need to be verified. Functionality testing, stability testing, and stress testing needs to be performed more effectively and efficiently.

An inter-DXC level test tool is needed which can test the behavior of multiple DXCs simultaneously, as well as individual DXC performance. The configuration of paths through multiple DXCs needs to be tested. Logical and physical testing at the inter-DXC level is needed.

SUMMARY OF THE INVENTION

The problem recited above and other limitations are overcome by the present invention. The present invention provides an advanced DXC Test Tool method, system and computer program product. The DXC Test Tool, in conjunction with a communications Test and Monitoring Unit (TMU), tests both the logical and physical responses of a DXC. In particular, the DXC Test Tool of the present invention has at least the following features and advantages:

Provides an improved method of testing with scripts, resulting in a reduction in the number of lines of script and an increase in the functionality of script commands. A 4000:1 or greater reduction in lines of script realized. The DXC Test Tool scripts utilize ranges, repeatable commands and pointers to data tables. Data tables specify which devices and ports to act on, thereby removing the need to use a separate command line for each device and port. The reduction of code allows modifying scripts for new software releases to be performed quickly and easily.

Scripts are repeatable and can be run in parallel. This allows stability and stress testing to be performed. Scripts can also be run for multiple DXCs simultaneously. This allows for multiple DXC control testing, such as end-to-end DXC testing, to be performed to simulate and detect real-world network events. Such events include setting up a multi-DXC circuit, knocking down a circuit, and outages, which are detected by alarm conditions transmitted through a network environment.

Supports multiple interfaces of multiple types. Specifically, the DXC Test Tool supports both X.25 synchronous interfaces (for binary messages) and RS-232 asynchronous interfaces (for ASCII messages) for at least ten DXC devices and multiple TMUs, simultaneously. This greatly improves the stress testing capabilities of the invention. It also allows the invention to test end-to-end connections of multiple DXCs.

Provides an automated method for testing the logical responses received from a DXC against the actual physical action performed. Before and after a command is sent to a DXC, the Test Tool requests a check on a cross connection from a TMU. The TMU responds to the Test Tool with indication as to whether a cross connect has been made or not. The Test Tool can then check if the response received from the DXC is accurate in reflecting the physical action performed by the DXC.

Provides an automated means for logically configuring the DXC. The Test Tool has a database of DXC configuration files, which are input from the user. The Test Tool uses data from these files to generate and send commands to each DXC to configure it in a known state. Thus, when testing proceeds, appropriate results may be predicted.

Provides an automated means for performing analysis of test results. During processing of a script, every command that is sent to a DXC has an expected response recorded. When the actual response is received, it is compared with the expected response. If they do not match, the actual response is recorded as an exception in an Analysis Log. Unexpected responses from the TMU, which indicate that a DXC did not perform the action that the DXC response message indicated, are also recorded as exceptions in the Analysis Log. All messages are recorded with a timestamp. The user may refer to the Analysis Log to identify all exceptions, and use the timestamp to refer to them in the Communications Trace Log. All records of both logs are organized into fields so that the user may apply filters to them to further reduce searches. This greatly reduces the time and effort needed to analyze test results.

Provides remote control of the Test Tool so that users at distance locations may use it to perform testing.

Provides means for interactive and dynamic script execution.

In addition, the script language interpreter is upward compatible. That is, scripts from existing test tool systems can be utilized until replacement scripts are created.

The DXC Test Tool utilizes simulated multi-tasking to support multiple interfaces for at least ten DXC devices, interfaces to multiple TMUs, user interfaces (via keyboard, mouse, and monitor), and database interfaces. The servicing of each interface is performed in a pseudo-parallel fashion, in accordance with the method described in the patent application incorporated by reference above, so as to simulate multi-tasking in that no external user or device perceives an interruption in processing.

In one embodiment of the present invention, a computer testing system, method, and computer program product is provided for testing one or more digital cross connect devices (DXCs) with one or more test and monitoring units (TMUs). A DXC test tool is coupled to each DXC and to each TMU. The DXC test tool sends a logical command for placing at least one DXC in a known state. The logical command can be, among other things, a command for establishing a cross connect, disconnecting a cross connect, monitoring, provisioning, signaling, or any other DXC command.

A TMU then tests the physical presence of the known state in the DXC. The TMU sends a response to the DXC test tool indicating whether the known state is present. In this way, the DXC test tool can test each DXC in physical and logical dimensions.

According to another feature of the present invention, the DXC test tool can communicate over a plurality of communication links including fast channel links, human readable links, and remote control links. Routers are used to expand capacity. Preferably, X.25 links, RS-232 links, and a Ethernet IP link are used. The DXC test tool further includes a single message display option for selecting between sending ASCII messages and sending binary messages.

According to another feature of the present invention, the DXC test tool provides inter-DXC level testing including end-to-end path testing. The DXC test tool sends a plurality of logical cross-connect commands defining a network path through multiple DXCs. One or more TMUs test the physical presence of the network path and send responses to the DXC test tool indicating whether said network path is in a known state. In this way, the DXC test tool can perform end-to-end path testing in physical and logical dimensions.

According to another feature of the present invention, the DXC test tool stores expected DXC responses that will be sent by one or more DXCs in response to logical cross-connect commands sent by the DXC test tool. The DXC test tool compares actual DXC responses to the expected DXC responses stored and generates an analysis log of unexpected DXC responses. The DXC test tool also includes unexpected responses sent by TMUs in the analysis log.

The DXC test tool generates a communication log of all messages sent to and from the DXC test tool. A timestamp is preferably included for each message in the analysis log and the communication log. The communication log and analysis log are also comprised of records having data fields so that a user can filter the logs to screen selected records and data fields.

The DXC test tool has a script database storing scripts. Each script defines a testing scenario for the DXCs. According to another feature of the present invention, a scripting language is used that significantly reduces the number of lines required for a script. The scripting language used in the scripts includes global script directives (automatic and repeating), ranges, substitutable table entries, and pointers that point to data tables. In addition, one or more DXCs can be tested by running multiple scripts substantially in parallel.

In one preferred embodiment, the DXC test tool has an intelligent processor coupled to a communication interface, user interface, and data base interface. The intelligence processor provides simulated multi-tasking. The intelligence processor includes a script message processor for processing a script, a control link servicer servicing each communication link, a user-interface servicer servicing the user-interface to detect user inputs and provide output for displays, a database servicer servicing the database interface, a message generator generating messages based on the data files, and a link selector for selecting communication link(s) to carry messages generated by the message generator. A simulated multi-task controller switches the control of the intelligent processor between the script message generator, control link servicer, user interface servicer, and database interface service in a psuedo-parallel fashion simulating multi-tasking. Data files stored by the DXC test tool include a script, communication trace log, analysis log, summary log, initial device configuration file, single message configuration file, and diagnostic report.

In another preferred embodiment, the DXC test tool is implemented as a computer program product. A computer useable medium has computer program logic recorded thereon for enabling a processor in a computer system to test one or more DXCs with one or more TMUs.

Further features and advantages of the present invention, as well as the structure and operation of various embodiments of the present invention, are described in detail below with reference to the following drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

Figure 1:
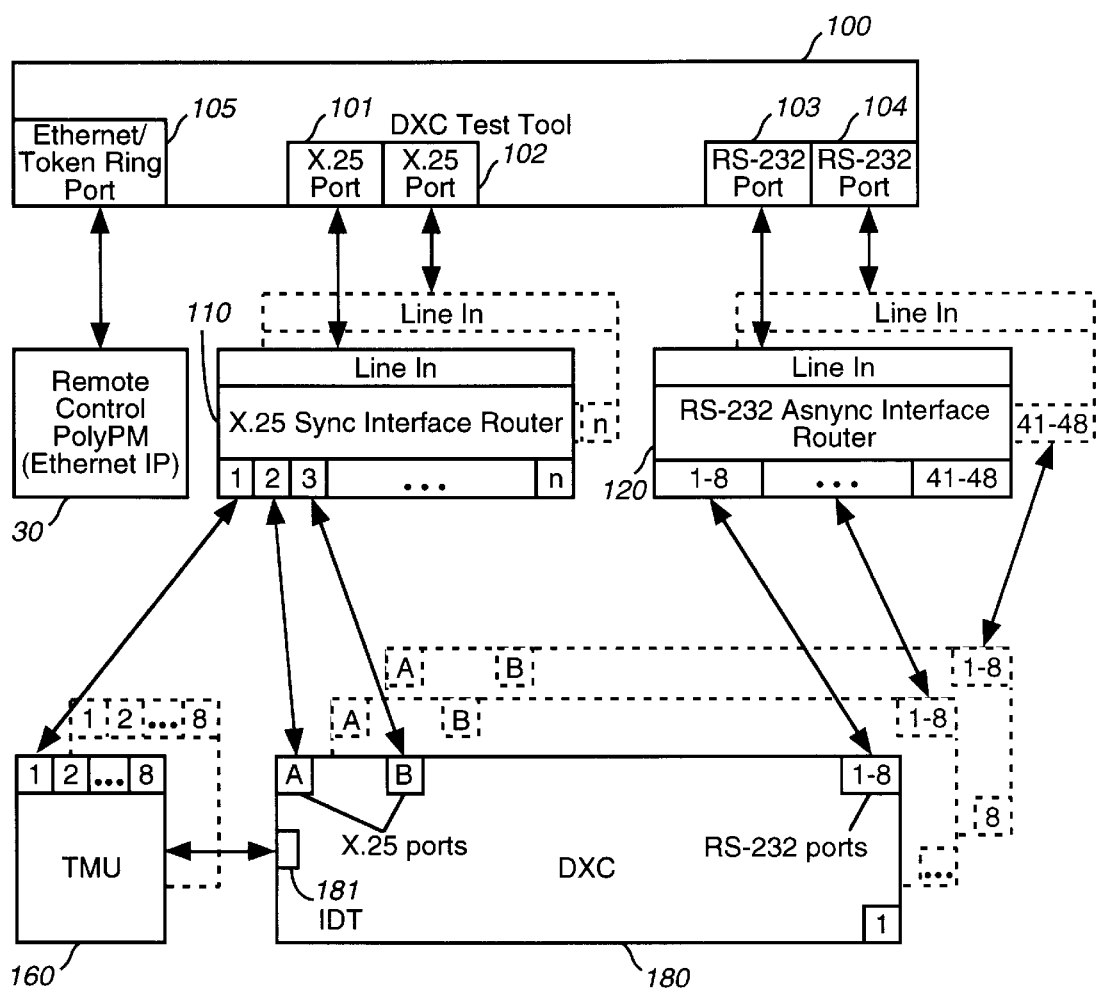
FIG. 1 is a block diagram showing a DXC test tool and testing environment according to the present invention.

The present invention will now be described with reference to the accompanying drawings. In the drawings, like reference numbers typically indicate identical or functionally similar elements. Additionally, the left-most digit(s) of a reference number typically identifies the drawing in which the reference number first appears.

DETAILED DESCRIPTION OF THE PREFERRED EMBODIMENT

The present invention provides a DXC test tool that is an improvement over conventional systems and methods for testing DXC hardware and software releases. Among other things, the present invention overcomes conventional testing limitations as specified in the Solution statement above. Features of the present invention include:

Use of a TMU to test physical response of a DXC against expected logical response, thereby, providing a second dimension of testing.

Scripting language that reduces amount of code needed, provides increased functionality, and reduces time and efforts needed for modifications through use of directives, ranges, substitutable data tables, and repeatable commands.

Support of multiple device interfaces of multiple types.

Use of simulated multi-tasking routine to support multiple device interfaces, user interfaces, database interfaces, and script processing simultaneously.

Ability to test multiple DXCs simultaneously, including end-to-end testing.

Automatic initializing of the logical configuration of DXCs.

Use of Analysis Log to perform analysis and significantly reduce the amount of test results that must be read.

Provides remote control of test tool by providing a remote link, such as, an Ethernet or Token Ring link.

The DXC test tool significantly reduces the time and effort needed to develop new testing procedures for each new software and hardware release of a DXC.

Terminology

To more clearly delineate the present invention, an effort is made throughout the specification to adhere to the following term definitions as consistently as possible.

"Nodes," also referred to as sites, are distributed across a communication network for performing switching, routing, multiplexing/de-multiplexing, and other network functions. These nodes can be configured as a ring, mesh, cluster, tandem combination, multi-level hierarchy, and/or any other network topology. Such nodes can include but are not limited to digital cross-connect (DXC) nodes including DXC 3/3 nodes that switch DS3 signals, hybrid DXC 3/1 nodes that switch DS1 and DS3 signals, and/or DXC 1/0 nodes that switch DS1 and DS0 signals.

The terms "test and monitor unit," "TIMU," "remote test system," "remote testing unit," and equivalents thereof, all refer to a testing system which tests one or more corresponding nodes. Such testing can be local or remote and can include any type of network control function such as testing, monitoring, controlling, managing, signaling, load balancing, data routing, restoring, dynamic line configuration, private or dedicated line servicing, EIDTS, TMU, Test Access Digroup testing (TAD), Facilities Access Digroup testing (FAD), and/or any other network control function.

The term "communication network," and equivalents thereof, refer to any type of data communication network. Any type of data and format can be used in the communication network. Audio, video, telephony, computer, and/or other forms of data can be used. Optical, electrical, and electromagnetic radiation signals can be transported. For example, DS0 to DS4 type data stream formats, SONET Optical Channel OC-1 to OC-198 formats, and/or any other time-domain signal at different bit rates can be used.

The term "internet" is used as a broad descriptor including, but not limited to, Transmission Control Protocol and/or Internet Protocol (TCP/IP), communication compatibility. For example, "internet link" refers to any internet data communication link including, but not limited to, a logical TCP/IP link.

Example Environment

The present invention is described in the example environment of a computer test tool which fully tests one or more digital cross-connect devices (DXCs). The DXCs can be tested while they are operating in a communication network, or prior to installation. Description in these terms is provided for convenience only. It is not intended that the invention be limited to application in this example environment. In fact, after reading the following description, it will become apparent to a person skilled in the relevant art how to implement the invention in alternative environments. For example, the test tool of the present invention is not limited to test DXCs. The test can be applied to test logical and physical response of any controlled device.

DXC test tool Overview a. Testing Environment

FIG. 1 is a block diagram illustrating the deployment of a DXC test tool 100 in a testing environment. The DXC test tool 100 runs primarily as software on any standard personal computer (PC) (not shown) equipped with one or more communication ports and corresponding cards. Preferably, three types of ports are used to provide fast channel communication, serial, human readable communication, and remote control. In the example of FIG. 1, two X.25 communication ports 101,102, two RS-232 ports 103,104, and an Ethernet or Token Ring port 105 are used. Of course, the DXC test tool 100 may also run on more expensive midrange computers and high-end computers with more processing power. Although the DXC test tool 100 is described with reference to a primarily software implementation, any or all of the functions of DXC test tool 100 as described herein can be implemented in software, firmware, hardware, or any combination thereof depending upon implementation and other design goals. Example computer system embodiments are described in more detail below with respect to FIG. 8.

DXC test tool 100 can test multiple DXCs simultaneously. Two physical X.25 synchronous interfaces, each with 256 virtual circuits, can be coupled to each DXC to carry binary messages. Multiple RS-232 asynchronous interfaces can be coupled to each DXC to carry ASCII messages. In FIG. 1, these interfaces utilize routers to connect a single physical port from the test tool to multiple physical ports on the DXCs. In this way, capacity is increased. An X.25 synchronous router 110 is used to route fast channel messages between the X.25 ports 101,102 on the test tool and two X.25 ports A,B on each DXC. A typical X.25 router 110 may have 16 line-out ports (n=16), and can thus support interfaces for up to 8 DXCs. Additional X.25 routers may be used to support additional DXCs as shown by the phantom dotted lines in FIG. 1. To scale down, the X.25 routers (and RS-232 routers) can be removed and replaced with a direct connection.

An RS-232 asynchronous interface router 120 is used to route human-readable, ASCII messages between the RS-232 ports 103,104 on the DXC test tool 100 and the RS-232 ports 1–8 on each DXC 180. A typical RS-232 router may have 48 line-out ports, and can thus support interfaces for up to six DXCs (if all eight RS-232 ports on each DXC are used). Additional RS-232 routers may be used to support additional DXCs as shown by the phantom dotted lines.

DXC test tool 100 can be equipped with as many X.25 and RS-232 ports as will be needed for testing. A typical server-grade PC can support eight card slots. Using all eight slots, an example configuration of the DXC test tool 100 would have one Ethernet port 105 for remote control, two X.25 slots 102,103, two RS-232 slots 103,104 and an extra RS-232 slot. Other configurations are possible.

X.25 ports 101,102 are linked directly to the X.25 router 110. RS-232 ports 103,104 are linked directly to the RS-232 routers 120. Multiple DXCs may be supported by each DXC test tool port 101–104 since the messages that are sent out by the DXC test tool are addressed to specific DXCs. Likewise, messages received by the DXC test tool have indications to which DXC they came from.

The X.25 and RS-232 ports (A,B, 1–8) shown on the DXC 180 are control ports used to send and receive messages. Normally, the DXC messages are sent to a control and monitor system. During testing, the test tool 100 communicates with the DXCs through the DXC control ports (A,B, 1–8). DXC 180 also has interDXC trunk (IDT) communications ports through which data traffic is switched. For clarity of illustration, the IDT ports are not shown. These IDT ports are what the DXC logical cross-connects use to redirect traffic through a telecommunications network. The TMU 160, described below, monitors the IDT ports to test the physical DXC electrical interface.

DXC test tool 100 also interfaces with one or more communications Test and Monitoring Units (TMU) 160. A TMU 160, of which several types exist in the industry, is used to test the electrical signal connections at each DXC's IDTI ports. An exemplary TMU 160 is the Centest 650 (CT 650) manufactured by Centest, Inc. Each CT 650 can support up to eight simultaneous sessions with the test tool 100, and can monitor up to 30 DXC IDT ports. Usually, one CT 650 will be sufficient for testing. However, as with the X.25 routers and the RS232 routers, the architecture is highly scalable, and additional TMUs (e.g., CT 650s) can be added to provide extensive cybernation.

DXC test tool 100 has an X.25 interface, via the X.25 router 110, with one or more TMU devices 160. The TMU 160 has an interface to each DXC (up to 30 per TMU) for monitoring and testing cross-connects between communications ports as described in more detail below. In a small scale environment, DXC test tool 100 can be directly connected to the TMU 160, or the TMU 160 can be eliminated.

TMU 160 tests whether a DXC 180 is placed within a known state. For example, TMU 160 tests whether or not a logical to physical cross-connect is successful within a DXC 180 by testing an appropriate electrical signal between two DXC IDT ports. TMU 160 can perform tests on demand from the DXC test tool 100. This provides an additional dimension of DXC testing not found in the conventional DXC testing systems. DXC test tool 100 sends a cross-connect command to a DXC 180. DXC 180 may respond with a positive response indicating a logical cross-connect has been made. DXC test tool 100 then uses TMU 160 to determine if that cross-connect was physically performed. This can uncover failures in the responses provided by DXC 180.

TMU 160 receives two categories of commands from DXC test tool 100. Monitor commands are non-intrusive and instruct TMU 160 to monitor a particular interface on a DXC 180. TMU 160 sends a response back to DXC test tool 100 indicating whether the interface is "on" or "off." Test commands are intrusive and engage the TMU 160 in active testing of the DXC physical interface.

b. Example DXC Testing Process

An example process of how testing of a DXC 180 is performed with the DXC test tool 100, utilizing the capabilities of the TMU 160, is as follows:

1. DXC test tool 100 sends a Monitoring command to TMU 160 to check if particular communications IDT port interface is on or off.
2. TMU 160 monitors DXC 180 and determines the IDT port is physically off.
3. TMU 160 sends response to DXC test tool 100 indicating DXC IDT interface is off.
4. DXC test tool 100 sends cross-connect command to DXC 180.
5. DXC 180 responds with message (cross-connect made).
6. DXC test tool 100 sends Monitoring command to TMU 160 to check if DXC IDT interface is on or off.
7. TMU 160 monitors DXC IDT interface and determines it's on.
8. TMU 160 sends response to DXC test tool 100 indicating DXC IDT interface is on.
9. DXC test tool 100 writes all messages to a Communication Trace Log.
10. DXC test tool 100 writes only unexpected messages to an Analysis Log, in this case results were expected so no message is written.

The above process is performed in accordance with user-specified scripts. These scripts, which will be described in detail later, instruct the DXC test tool 100 to send and receive various messages to/from both the DXCs 180 and the TMUs 160.

The multiple interfaces that the DXC test tool 100 has with the DXCs, the TMU 160s, and the user are all supported simultaneously with the use of a simulated multi-tasking routine. This routine strategically transfers control of a DXC test tool 100 processor in such a manner as to service each interface with no perceived interruption to any other interface. This enables the invention to test multiple DXCs, utilize TMUs, and interface with a user at effectively the same time.

Further, by testing multiple DXCs at once, DXC test tool 100 can perform end-to-end testing of circuits through several DXCs linked together. The user can connect several DXCs together, issue commands from the DXC test tool 100 to build a circuit spanning multiple DXCs 180, and then use one or TMU 160 to test the circuit. This integrated, end-to-end testing through linked DXCs was not possible with conventional test systems that were limited to manual and time-consuming testing of solitary DXCs in isolation.

DXC Test Tool Preferred Embodiment

FIGS. 2 to 7C illustrate the architecture and operation of one preferred embodiment of DXC test tool 100 according to the present invention.

a. Architecture

Figure 2:
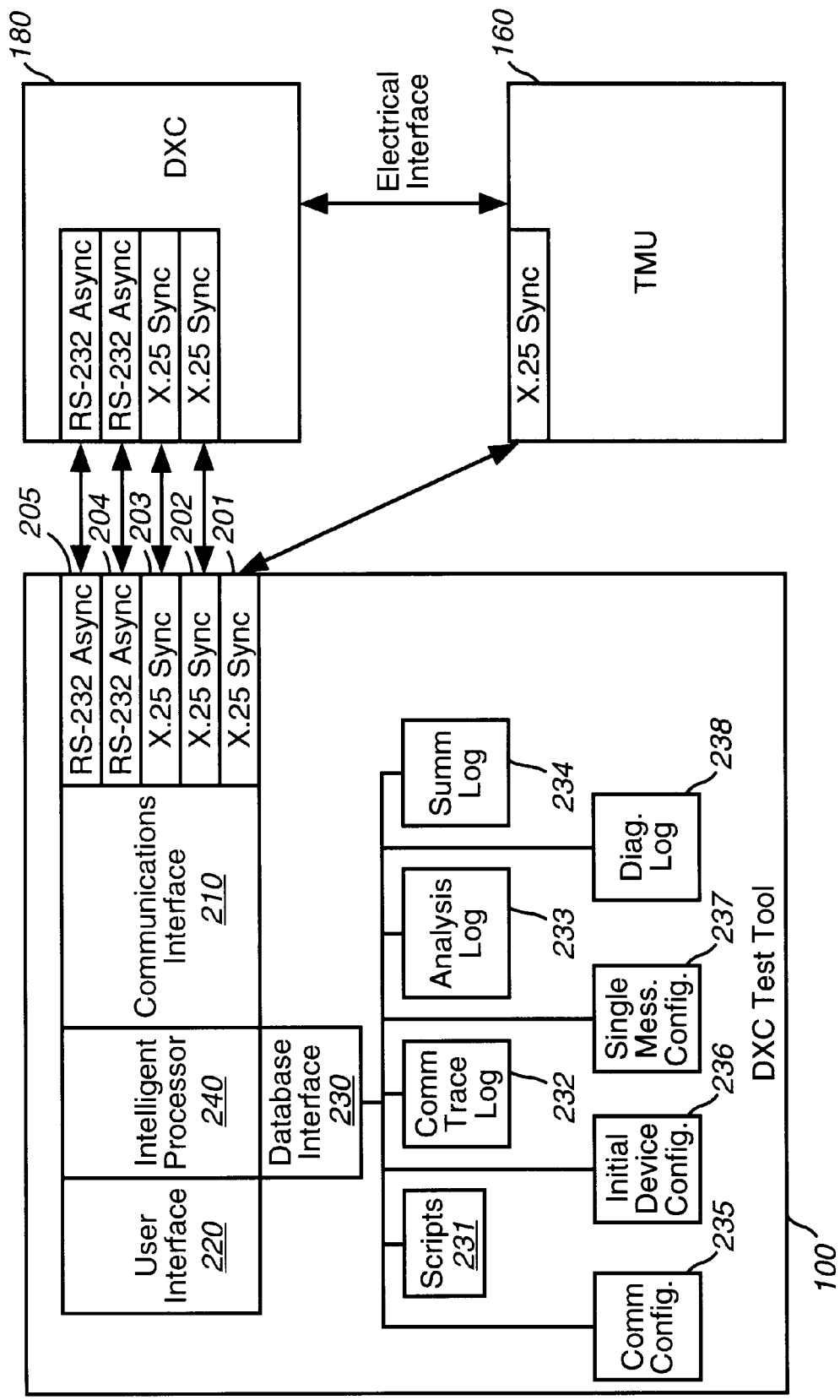
FIG. 2 is a block diagram showing the DXC test tool of FIG. 1 in more detail.

FIG. 2 is a block diagram illustrating the logical architecture of the DXC test tool 100 in use to test one or more DXC devices. For clarity, only one DXC 180 and TMU 160 are shown. DXC test tool 100 consists of four primary modules 210–240 and several databases 231–238. A Communications Interface 210 provides the data communication processing needed to utilize the communications ports and interfaces with external devices. The X.25 and RS-232 port interfaces 201–205 shown are preferably logical interfaces to DXC 180 and TMU 160.

User Interface 220 controls a keyboard, mouse, monitor, and any other peripheral I/O device for user input and tool output. Database Interface 230 manages each of the databases, extracting data from and writing data to these databases 231–238. Intelligent Processor 240, which is shown in greater detail in FIG. 3, controls the internal processing of DXC test tool 100, such as script execution and message generation.

As mentioned earlier, DXC test tool 100 contains several databases 231–238. Scripts database 231 is used to save script files created by the user. These scripts, which will be described in detail below, contain proprietary command structures that are executed in real-time by the DXC test tool 100 to send various commands to DXCs 180 and TMUs 160 to perform testing scenarios. Sending monitor and test commands to DXC 180 emulates a network monitoring and control system. The responses received by the DXC test tool 100 from both DXC 180 and TMU 160 are analyzed to produce test results.

Scripts are written and stored in the Scripts database 231. Scripts may then be retrieved by the user and executed to test DXC 180. Multiple scripts can be run in parallel. For example, the simulated multi-task controller described below can switch between multiple scripts so that records in the scripts are executed in a substantially parallel fashion. Pointers can be used to trace the execution of the records in each script. Other types of multi-tasking systems and operating systems can be used.

DXC test tool 100 also allows a user to dynamically and interactively execute scripts one step at a time, for purposes such as debugging.

Communications Trace Log 232 is a database used to record all messages sent and received by the DXC test tool 100. These messages are timestamped, identified by device and communication link, and recorded for user reference. An example Trace Log and its constituent data fields is described below with respect to FIG. 11.

Analysis Log 233 is a database used to record all exception messages received. This is a further feature of the DXC test tool 100, in that it provides a more efficient method for analyzing test results. Each command sent by the DXC test tool 100 (in the form of a message) has a field defined in the script record that identifies an expected response. This response is recorded in a temporary memory buffer when the command is sent. When an actual response is received, it is compared with the expected response. The entire response message is written to the Communications Trace Log 232, but it is only written to the Analysis Log 233 during exceptional cases when the response message does not match the expected response. Comparisons of expected responses to actual responses, and the recording of exceptions, are performed for both the DXC 180 commands/ responses and the TMU 160 commands/responses.

These exception messages are timestamped and identified by device and communication link. To analyze test results, a user simply reads the Analysis Log 233 for all "unexpected" responses received. Since the unexpected response messages are timestamped, the user may also refer to the Communications Trace Log 232 to find even greater context. This is an improvement over conventional testing systems, in which a user would have to read through literally hundreds of thousands of records in a Communications Trace Log (for a typical script execution).

Further, in the present invention, records in both the Analysis Log and the Communications Trace Log are divided into well-defined data fields not just long character strings. This allows the user to search by data field to filter results of either log. For example, the user may request a report from the Analysis Log 233 showing all exception messages for a particular DXC device, or for a particular type of command. An example Analysis and its constituent data fields are described below with respect to FIG. 12.

Summary Log 234 is a database used to record DXC test tool 100 statistics for reporting. These statistics track the number of each type of message sent and received by the DXC test tool 100, the number of expected and unexpected responses, and message durations. Each type of message is dynamically identified and added to the summary log. This filtering methodology includes only messages for this execution, which eliminates unnecessary entries. A display of summary statistics is provided, and dynamically updated, during script execution, as described with respect to FIG. 16.

Communications Configuration database 235 contains the communications parameters for each DXC being tested. These parameters define how the physical communication ports of the DXCs are configured. Communications Configuration database 235 and its file and constituent data fields structure is described below in section 7.(c)(i).

Initial Device Configuration database 236 contains parameters defining the logical internal connections of each DXC. This provides another advantage in the present invention. It allows the user to automatically configure each DXC prior to testing. Configuration here refers to the logical configuration of the DXC; that is, what internal cross connections are in place. Physical configuration of the DXC ports is always performed manually, but need only be performed once for testing. Logical configuration, which is automatic with the present invention, is usually performed prior to each test case.

To test DXC 180, it is important to logically configure DXC 180 to place DXC 180 in a known state prior to testing. A known state is required to adequately and efficiently test DXC 180, so that expected responses can be defined. Initial Device Configuration database 236 contains the data files that specify various initial configurations for one or more DXCs. DXC test tool 100 calls one of these files, and loads the data in the form of commands sent to the DXCs. These commands cause the DXCs to set provisional states and to perform various connects and disconnects to place them in a known state. Then, DXC test tool 100 may execute a script, knowing which state each DXC is in and therefore knowing what an expected response will be.

Preferably, the files contained in Initial Device Configuration database 236 are actually scripts that DXC test tool 100 executes. By executing an Initial Device Configuration script, the DXC test tool 100 sends the proper commands to the DXCs to place them in a known state prior to testing.

Single Message Configuration database 237 contains files of all message types that can be sent by the DXC test tool 100. These files are message templates that can be created and selected by the user. The user then supplies values for certain parameters, such as DXC device, link, and- channel identifiers, and sends the message. Specifically, database 237 contains two files. The ASCII.MSG files contains templates for all ASCII message types. The BINARY.MSG files contains templates for all binary message types. ASCII messages are transmitted verbatim. Binary messages are in the form where two ASCII characters represent each binary byte. An alternative implementation is to place all messages into one file and prefix the message type (i.e., A=ASCII, B=Binary, etc.).

Diagnostics Log 238 is a database of DXC test tool self-monitoring diagnostics. It contains application program trace data that is collected by DXC test tool 100 during processing. This feature allows for rapid diagnosis of anomalies that may occur in DXC test tool 100. Further description of the Diagnostic Log and its file and constituent data fields structure is provided below with respect to FIG. 12.

Figure 3:
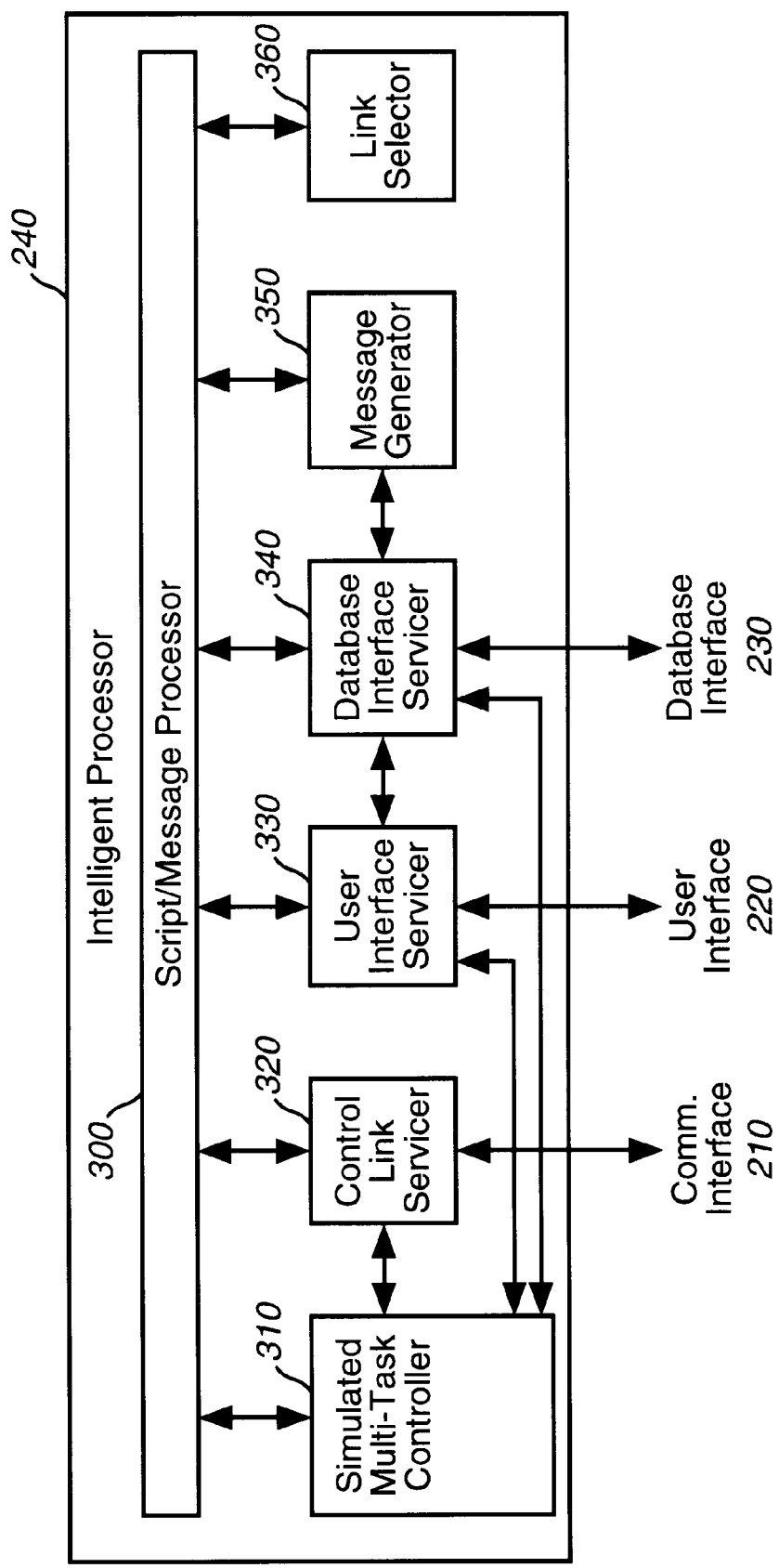
FIG. 3 is a block diagram showing an intelligent processor used in one embodiment of a DXC test tool according to the present invention.

FIG. 3 is a block diagram illustrating the detailed logical architecture of Intelligent Processor 240 identified in FIG. 2. Intelligent Processor 240 provides the intelligent processing of the DXC test tool 100 and interfaces with each of the other three logical interface modules 210–230. Intelligent Processor 240 includes the following program modules: Script/Message Processor 300, Simulated Multi-Task Controller 310, Control Link Server 320, User Interface Servicer 330, Database Interface Servicer 340, Message Generator 350, and Link Selector 360.

User Interface Servicer 330 detects and accepts input data, commands, and control from the user, via keyboard, mouse, or other types of peripheral I/O devices. It then passes this data to the Script/Message Processor 300 for processing, or to the Database Interface Servicer 340 for loading in the appropriate database shown in FIG. 2. The User Interface Servicer 330 also provides data, commands, and control to the user via a PC monitor or other output device. Input accepted from the user and output presented to the user are shown further in FIG. 5.

Database Interface Servicer 340 provides database management functions to the various databases 231–238 shown in FIG. 2. These functions include create, add, delete, modify, and queries. Database Interface Servicer 340 gets user input from the User Interface Servicer 330, as well as input from the output of the Script Processor 300 and responses from the DXC 180 and TMU 160, and updates databases 231–238. It also retrieves data from databases 231–238 to present to the user and to use as input to the Script Processor 300.

Simulated Multi-Task Controller 310 provides simulated multi-tasking as described in the above-incorporated patent application. Simulated Multi-task Controller 310 provides multi-tasking functionality among the User Interface Servicer 330, Control Link Servicer 320, Database Interface Servicer 340, and Script Processor 300. In this way, DXC test tool 100, according to the present invention, can service interfaces to the user, DXCs and TMU 160s, and process scripts, substantially simultaneously with no perceived interruptions.

The operation of the Script Processor 300, Control Link Servicer 320, Message Generator 350, and Link Selector 360 will be described with reference to the process diagrams in FIGS. 6A and 6B.

b. Inputs and Outputs

Figure 4:
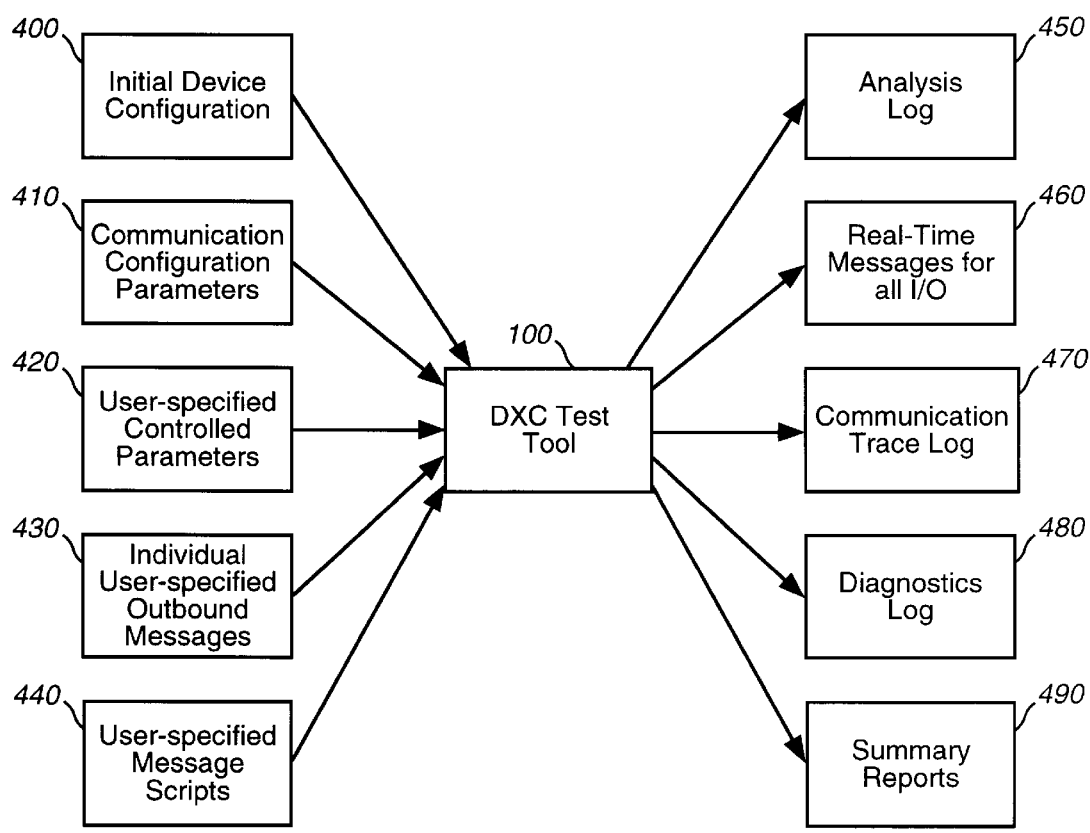
FIG. 4 is a diagram showing inputs and outputs from a DXC test tool according to the present invention.

FIG. 4 is a block diagram illustrating the inputs 400–440 and outputs 450–490 to and from the DXC test tool 100. Inputs 400–440 represent what data DXC test tool 100 receives from a user. Outputs 450–490 represent what data DXC test tool 100 supplies to the user.

Initial Device Configuration 400 represents data that a user inputs to DXC test tool 100 to specify logical internal configurations of DXCs. DXC test tool 100 uses this data to send commands to the DXCs to put them in a known state prior to testing. The user may enter this data and store it as a file in the Initial Device Configuration database 236 shown in FIG. 2. Alternately, the user may enter initial device configuration data and have the DXC test tool 100 process the data (e.g., send commands to DXCs) in real-time.

Communication configuration parameters 410 represent data used to build communication configuration database 235. User specified control parameters 420 represent user inputs to control the operation of DXC test tool 100. Individual user specified outbound messages 430 represent specific binary or ASCII messages sent from DXC test tool 100 based on direct user inputs. User specified message scripts 440 represent scripts loaded or input by a user into scripts database 231.

DXC test tool 100 outputs include an Analysis Log 450, Real-Time messages 460 for all inputs and outputs from test tool 100, Communication Trace Log 470, Diagnostics Log 480, and Summary Reports 490.

Further description of inputs and outputs from DXC test tool 100 is described below with respect to user interface options in FIG. 5, script execution FIGS. 6A and 6B, and script record execution process FIGS. 7A–7C, and an example test tool implementation FIGS. 8–17.

C. User-Interface Options

Figure 5:
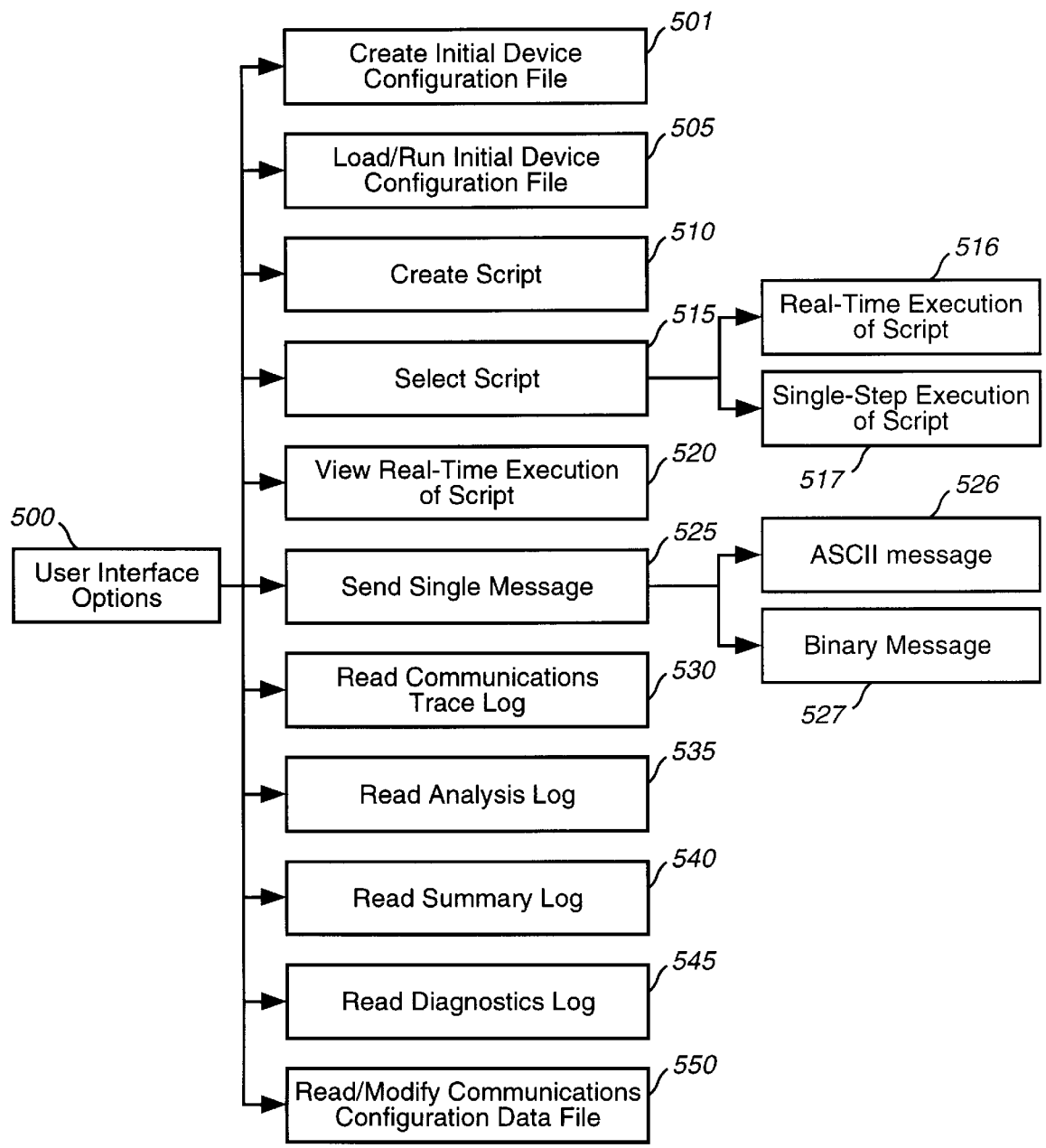
FIG. 5 is a diagram showing user interface options for a DXC test tool embodiment according to the present invention.

FIG. 5 is a process flowchart illustrating selected user interface command options 500. Preferably, DXC test tool 100 presents the user with a series of menus that allow the user to select any of the following commands 501–550:

Command 501 allows a user to create an initial device configuration file, and store it in the Initial Device Configuration database 236. This file specifies an initial logical configuration of one or more DXCs. An example of logical configuration includes what has been provisioned or internal connections (port-to-port interfaces) a DXC has active. Initializing the configuration will put a DXC in a known state, which is necessary for formulating expected responses to DXC commands.

Command 505 loads and runs an initial device configuration file. The user first selects an initial device configuration file from the database 236, then instructs DXC test tool 100 (via menu selection) to load and run that file. DXC test tool 100 will read the records in the file specifying the initial configuration of each DXC, and then send commands to the appropriate DXCs to place them in the specified configuration.

Command 510 creates a script by writing records in ASCII text and saving the script in the Scripts database 231. Scripts may be copied and modified to avoid having to write each script from scratch.

Command 515 allows a user to select a script from the Scripts database 231. The user then has two options for executing the script. DXC test tool 100 can execute the script in real-time or in background, which is helpful in DXC relief testing (command 516). DXC test tool 100 can also execute the script one step at a time, with each step being triggered by user input (command 517). This method is helpful in debugging DXC test tool scripts and DXC configuration.

Command 520 displays a real-time execution of the script in a display window. Each message sent and received by the DXC test tool 100 is displayed.

Command 525 allows a user to send a single message to a DXC 180 or TMU 160, as opposed to running a script. DXC test tool 100 contains message templates in Single Message Configuration database 237. The user selects a template based on the type of message they wish to send. The template selection is from the ASCII.MSG or the BINARY.MSG file, based on whether the user wishes to send an ASCII message 526 or binary message 527. The user specifies values for the corresponding parameters, and instructs DXC test tool 100 to send that message.

The user can read various logs including the Communications Trace Log, Analysis Log, Summary Log, and Diagnostics Log, which can be read through commands 530, 535, 540, and 545, respectively. The user can view these logs on the screen or request electronic reports drawn from these logs.

Finally, command 550 allows the user to read and modify the Communications Configuration Data file 235. This file specifies the physical configuration of the DXCs; that is, the communications parameters of the physical ports on each DXC. This is usually done once when a DXC is initially connected to DXC test tool 100, and is good throughout several testing scenarios.

The user may use any of commands 500–550 while DXC test tool 100 is running, even when processing a script. Screens and data are presented to the user with no interruption, due to the simulated multi-tasking.

Testing Operation a. Scripts

Scripts are used to perform automated executions of test scenarios. A script is a series of records (stored as a file) that instruct the DXC test tool 100 to issue various commands to DXCs and TMUs, and to receive and analyze responses.

b. Optimized Script Language

DXC test tool 100 provides a unique scripting language that consists of two types of records: Commands and Directives.

i. Commands

Command records specify what types of commands DXC test tool 100 is to send to a DXC 180 or a TMU 160. Command records also specify how DXC test tool 100 will receive and analyze a response from a DXC 180 or TMU 160.

DXC test tool 100 uses SEND/RECEIVE records to communicate with the DXC 180, and MONITOR and TEST records to communicate with the TMU 160. A SEND/RECEIVE record refers to a single type of record (SEND). Receiving a response is implied for each SEND record, obviating the need for a separate RECEIVE record. A SEND record is used for any type of DXC command: cross-connect, disconnect, keep alive, audit, etc. MONITOR and TEST records are used to send monitor (non-intrusive) and test (intrusive) commands to a TMU 160.

ii. Directives

Directives specify programming functions, such as looping and repeating, that DXC test tool 100 uses to formulate and send commands. One example of a directive is called a Dynamic Send (DSEND). A DSEND causes DXC test tool 100 to repeat a SEND command every specified time period. A Dynamic Receive directive automatically allocates a new buffer to check for expected responses such as unsolicited DXC alarms. Another example of a directive is a REPEAT, which causes a script to be repeated a number of times.

DXC test tool 100 scripts can use data tables to indicate values for certain parameters. This replaces the necessity of including these values in the actual script records, and provides a further advantage of the present invention. Scripts may be modified extensively by simply replacing data in these tables. For example, a script may have a single record specifying a "cross-connect" command, and point to a table which specifies a series of DXCs and ports to perform the "cross-connect" command on. Values specified in data tables may be single values or ranges. Ranges specify a range of values for which a single script command is to be repeated. This eliminates the need to specify the same command multiple times. Ranges are specified with a "from" and "to" value.

To specify parameter values, a script record indicates a pointer to a data table, an actual value, a range of values, or a substitution value. Substitution values are substituted into a script record when the scrip record is run. Substitution values can include dates, times, and sequence numbers. In turn, a data table indicates a specific value, a range of values, or a logical value.

Unlike conventional script languages, the present invention provides a scripting language that allows substitutable data tables, repeatable commands, and ranges. This scripting language according to the present invention results in a significant reduction of script code, and makes script modifications/updates easier and quicker.

One or more scripts can be run across multiple DXC 180 and TMU 160 interfaces using multiple communication links. This is made possible by two aspects of the DXC test tool 100. First, the simulated multi-tasking routine allows multiple communications interfaces to be serviced simultaneously by the DXC test tool 100. Second, each SEND command generated by the DXC test tool 100 cross references to the Channel (CH) directive to specify precisely which DXC it is for. In fact, each command is addressed to a particular DXC, link (there are currently up to two physical X.25 and eight RS-232 links to each DXC), and channel (there are currently up to eleven channels per link on each DXC). These three parameters together make a complete address for each command message.

Each SEND command specifies, as a field in its record, an expected response. The expected response is what DXC test tool 100 expects to receive from the DXC as a response to its command. An expected response is also included with MON and TEST commands to TMU 160. The expected response is recorded in a temporary memory buffer when a command is sent to a device. It is not necessarily the entire verbatim response, but is preferably a partial string of characters and could include an offset to be found in the response. When the actual response is received, this character string that defines the expected response is searched for in the actual response. The extent of the match needed is variable.

The expected response also contains the three-parameter address of the sent command. Expected responses for several commands are stored simultaneously in a buffer until their respective actual responses are received. When an actual response is received, its three-parameter address is match to one in the buffer. Then the comparison may be made. Thus, the sequence of responses received does not need to reflect the sequence of commands sent; responses may be received in any sequence, as is the case in an actual DXC network.

SEND records contain an Action field. The Action field specifies what action DXC test tool 100 should take if the actual response does not match the expected response. Examples of possible actions are to continue with the next script record, jump to another non-sequential record, or abort script processing. Action field may also specify to not perform an actual-to-expected response comparison for that SEND command.

A SEND record also contains another field that indicates if the expected response is a multi-message response or a single-message response, or if no response at all is expected.

Script-driven testing and script record execution are described in detail in reference to FIGS. 6A, 6B and 7A–7C.

c. Script-Driven Testing

Figure 6A:
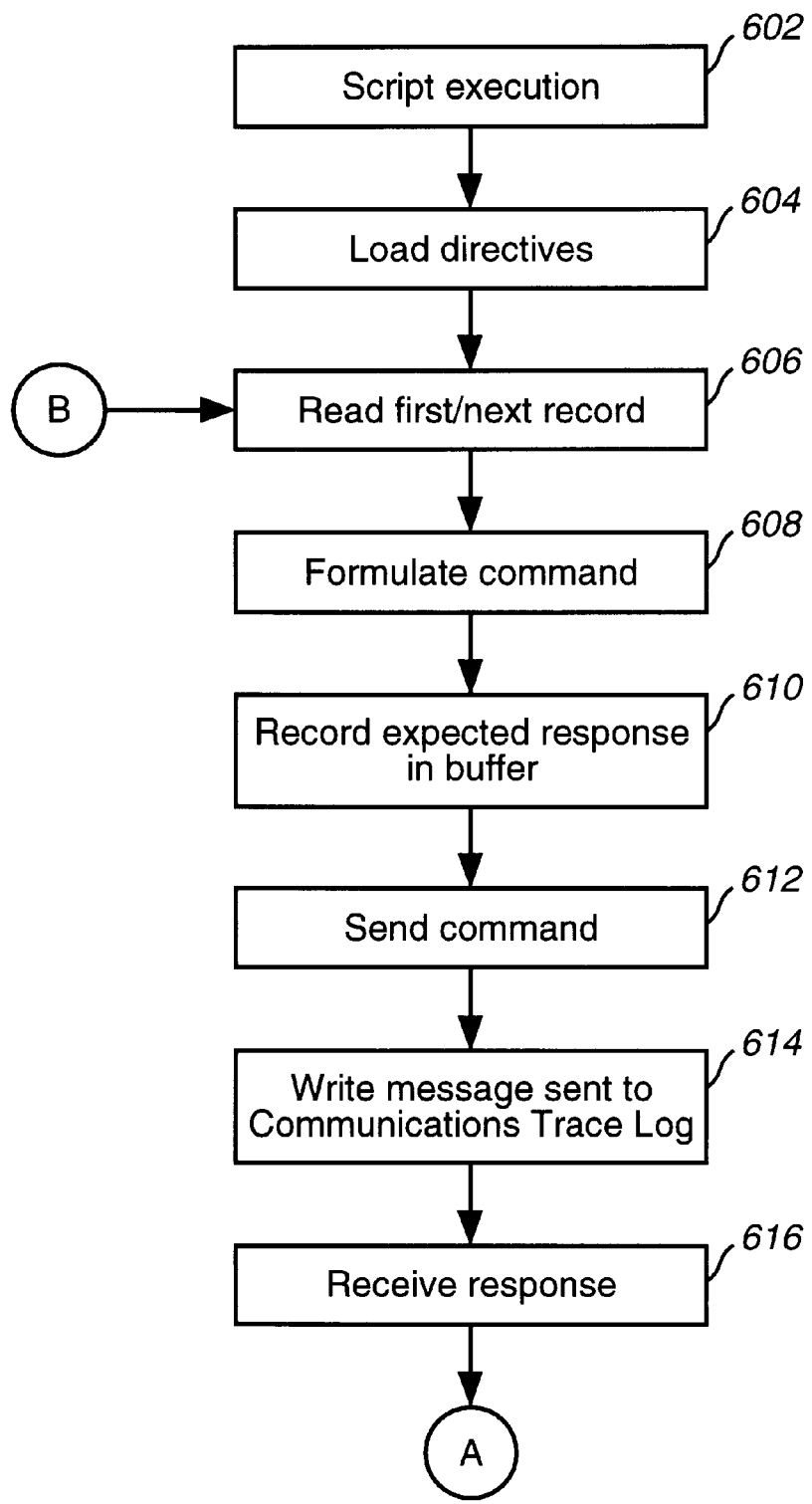
FIGS. 6A and 6B are flowcharts showing script-driven testing according to the present invention.
Figure 6B:
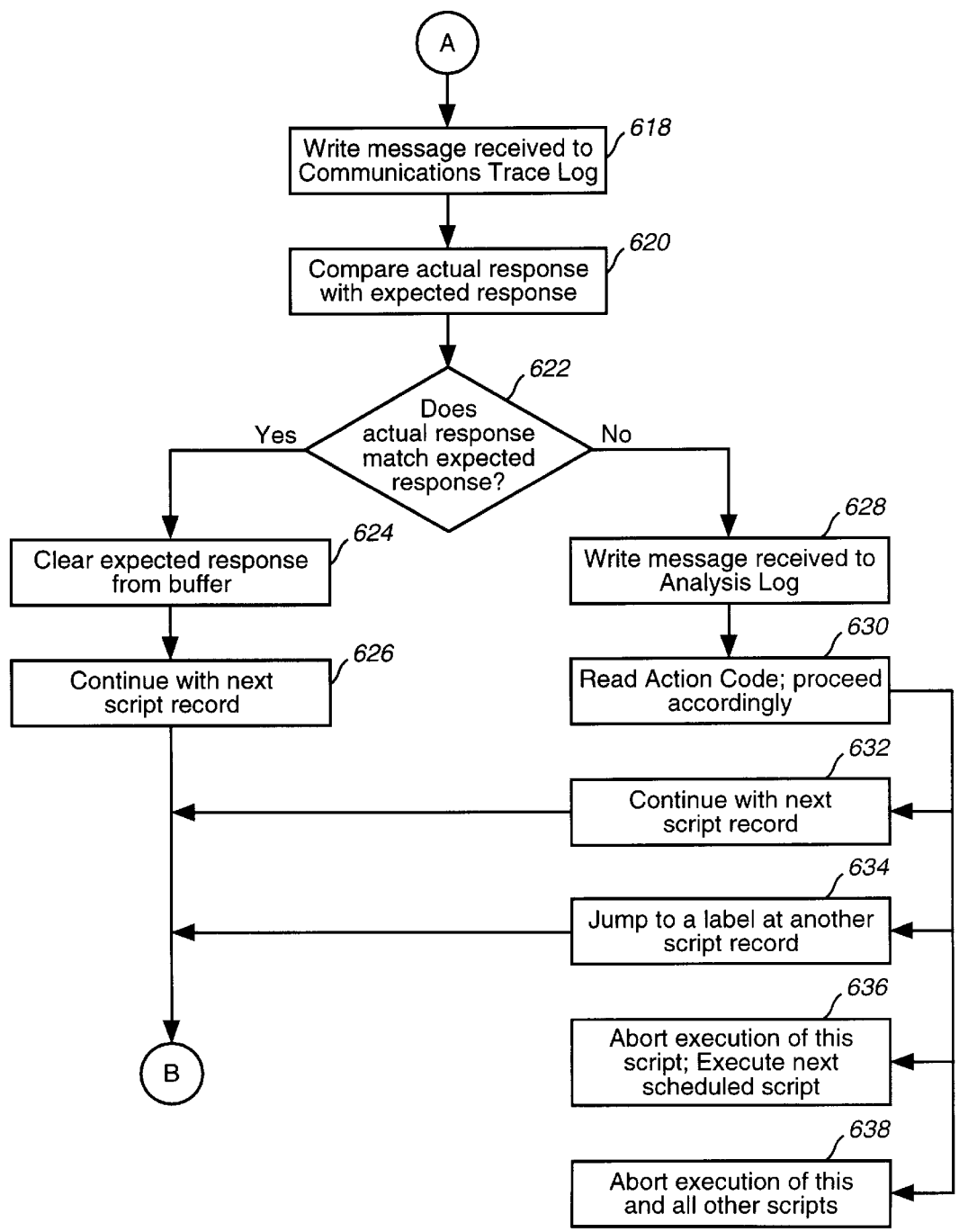

FIGS. 6A and 6B are a process flowchart illustrating the generalized operation of how DXC test tool 100 executes a script. As noted in reference to FIG. 5, script execution may be performed in real-time, or on a step-by-step basis. The logic flow illustrated in FIG. 6 will be the same for scripts executed in real-time or on a step-by-step basis. The script execution logic shown in FIGS. 6A and 6B is used to send commands, receive responses, and perform analysis on those responses. Commands and responses are treated the same for DXC 180 and TMU 160.

A single script can be executed for multiple DXCs and TMUs, which can be served by multiple interfaces to the DXC test tool 100. Each message sent and received by the DXC test tool 100 contains the three-parameter address (device, link, channel) that identifies where the message is being sent to or received by.

Step 602 is the selection of script execution, as indicated by the user via User Interface 220 and User Interface Servicer 330.

In step 604, Script Processor 300 begins reading the script. Preferably, directives are listed first on a script. Script Processor 300 loads these directives, which indicate how each specified command record is to be executed. This includes functions such as looping, repeating, communication link selection, and dynamic message transmission.

In step 606, Script Processor 300 begins reading command records. The execution of a script may be viewed as a looping process, in which each record is read and performed, and then the next record is read and performed (tail-end of loop indicated by off-page connector "B").

In step 608, Script Processor 300 instructs Message Generator 350 to formulate a DXC or TMU command, based on the SEND, MON, or TEST record that was read in step 606. The formulation of a command is in accordance with the DXC test tool 100 scripting language, described previously and in reference to the enclosed document. Each type of DXC and TMU 160, defined by the vendor, will have its own syntax required for commands. The script specifies the values and/or ranges of the various parameters that are to be included in the message, such as which ports to connect. As noted previously, the specification of parameter values may be made implicitly in the script, or preferably be included in a data table that is referenced in the script.

Parameter values can also be specified as a result of repeat commands and ranges.

In step 610, Script Processor 300 records the expected response in a temporary memory buffer. The expected response is specified in the ExpectedResponseN field of the script's command record (SEND, MON, or TEST). It consists of a character string, for ASCII or binary messages, which may range from partial to complete specification of an actual response to be received by DXC 180 or TMU 160. When an actual response is received, this string is searched for. If found, a "match" is assumed.

In step 612, DXC test tool 100 sends the command. Script Processor 300 passes to Link Selector 360 the three-parameter address that was identified in the script record. Link Selector 360 then selects the appropriate communications interface to send the command out on (refer to FIG. 1). The Intelligent Processor 240 passes the command message to the Communications Interface 210, which proceeds to send the message out on the appropriate port 202–205.

In step 614, Intelligent Processor 240 writes to Communications Trace Log 232, via Database Interface 230, the message that was just sent. The Communications Trace Log 232 is used to record all messages sent and received by the DXC test tool 100.

In step 616, DXC test tool 100 receives a response message from DXC 180 or TMU 160. Control Link Servicer 320 constantly monitors DXC test tool 100 communications links for incoming messages. This is performed, in accordance with the simulated multitasking routine, so that the Control Link Servicer 320 does not need to sit and wait for a message to be received before continuing with the next step. Rather, the DXC test tool 100's processor is controlled by the Control Link Servicer 320 just long enough to detect any incoming messages, then passed on to another task. This way, no other interface is interrupted by the Control Link Servicer 320 checking for messages.

A time-out directive can be added and set in the script. If a response is not received before the timer expires, processing continues with reading the next script record in step 606.

In step 618, the response message that was just received is recorded in the Communications Trace Log 232, in similar fashion to the command message that was sent in step 612 and recorded in step 614.

In step 620, Script Processor 300 compares the actual response message (received in step 616) with the expected response (recorded in step 610). Since several command messages may be sent at once (through the use of DSEND directives, repeat commands, and multi-line responses), there may be several expected responses sitting in temporary memory buffers. Each expected response in buffer and actual response received contain the three parameter address that uniquely identifies the message. Therefore, the actual response is simply matched to the appropriate expected response in buffer. As previously noted, the match need not be that of the complete message. A partial string may be identified as the expected response. This string is then searched for in the actual response. The extent of the match is defined by the user.

Step 622 tests if the comparison in step 620 resulted in a match. If so, then in step 624 the expected response is cleared from the buffer. In step 626, Script Processor 300 continues with the next record, and the process returns to step 606.

If the comparison in step 620 did not result in a match, then in step 628, the actual response message is record in Analysis Log 233. It is considered an unexpected response. It is timestamped with the time it was received and further identified by the device, communication port, and communication channel. This way, it can also be found in Communications Trace Log 232 if additional context is desired (it was similarly recorded in Communications Trace Log 232 in step 618).

In step 630, since the response was unexpected, the Action field of the script record that sent the command is read. This Action field specifies how Script Processor 300 is to proceed when an unexpected response is received. Various Action codes may be defined by the user; four are shown for illustration. In step 632, Script Processor 300 continues with the next record, and the process returns to step 606. In step 634, Script Processor 300 jumps to a label at another, non-sequential record in the script, and the process returns to step 606 to read that record. In step 636, Script Processor 300 aborts execution of the current script, and begins executing the next scheduled script. In step 638, Script Processor 300 aborts execution of all scripts.

d. Script Record Execution

Figure 7A:
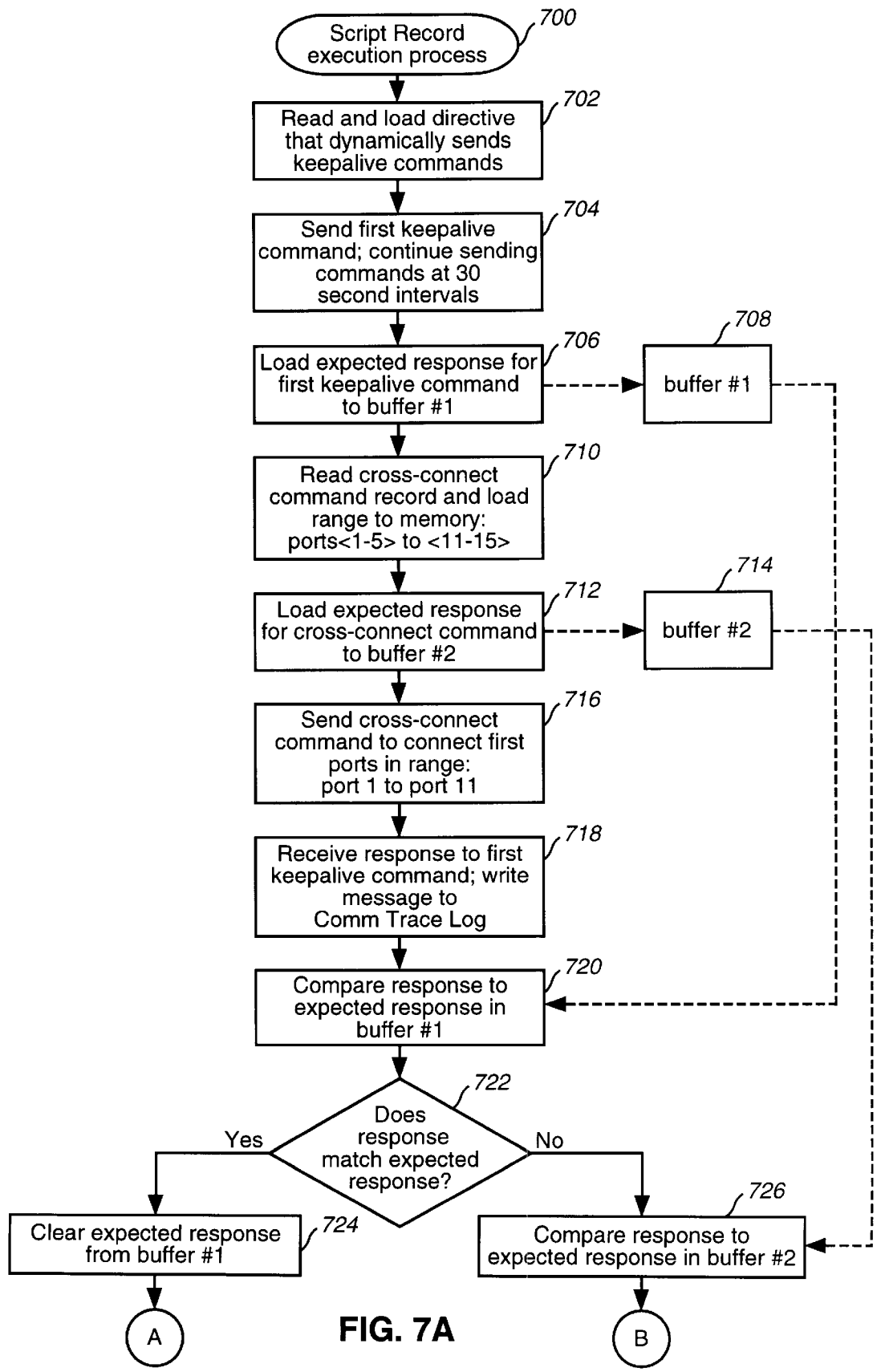
FIGS. 7A, 7B, and 7C are flowcharts illustrating a script record execution process according the present invention.
Figure 7B:
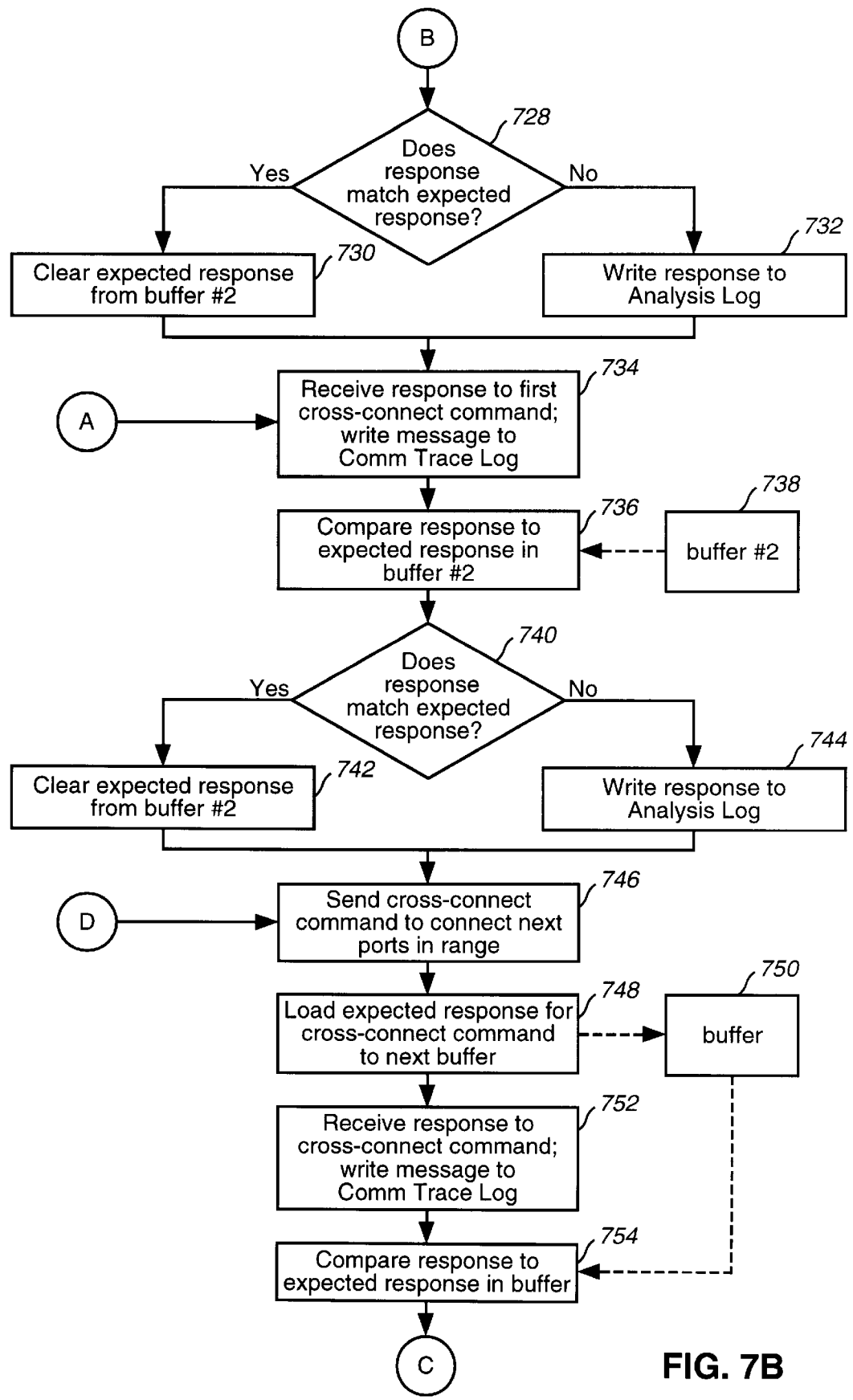
Figure 7C:
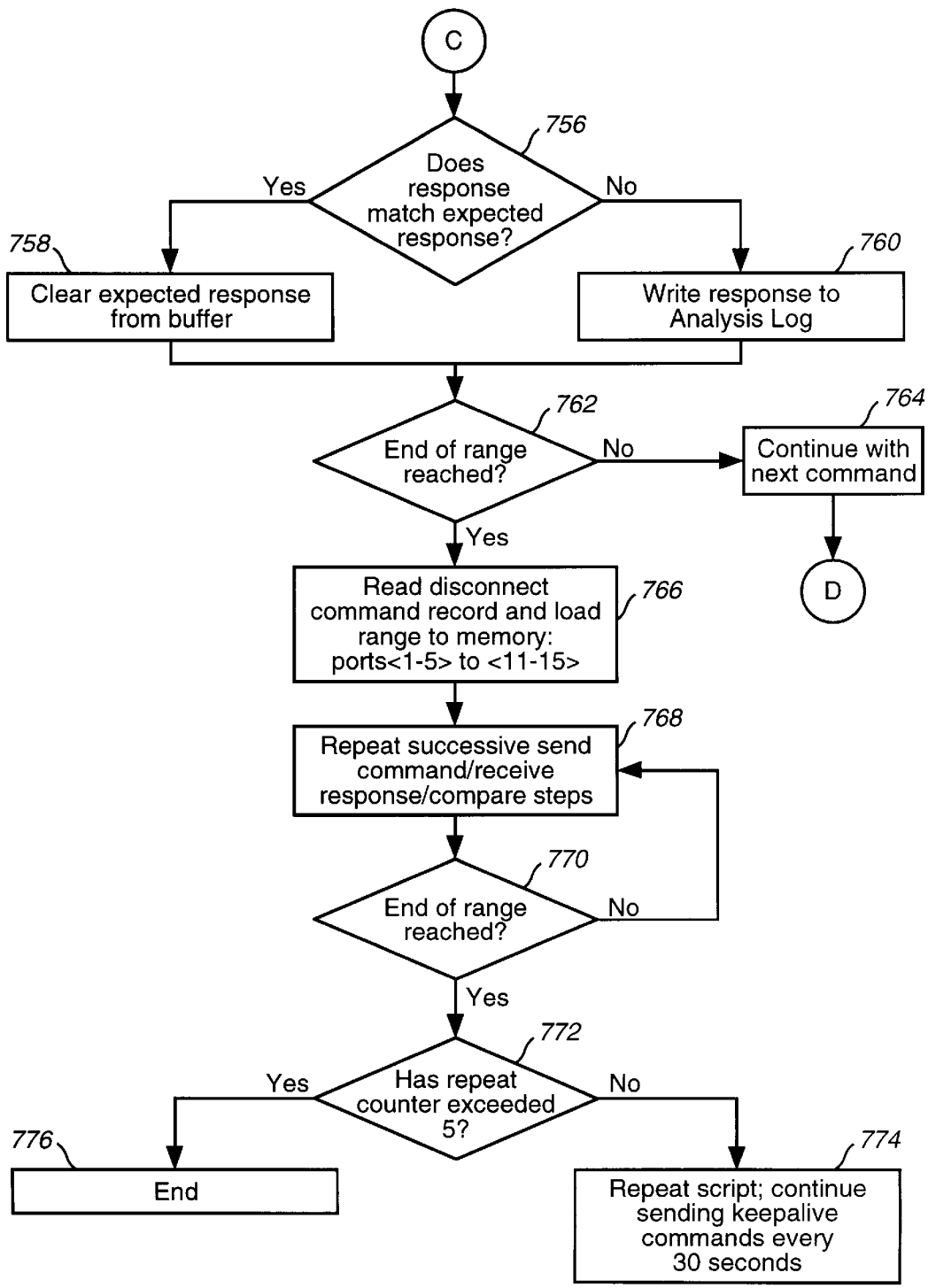

FIGS. 7A–7C are flowcharts illustrating an example process of how the DXC test tool 100 and in particular Script Processor 300, executes selected records from a script. This process follows the generalized logic of FIGS. 6A and 6B carried out by Script Processor 300 in reading script records for four sample command records:

1. DSEND KEEPALIVE, 30 SEC, (expected response)
2. SEND CROSS-CONNECT FROM <1–5>TO <11–15>, (expected response)
3. SEND DISCONNECT FROM <1–5>TO <11–15>, (expected response)
4. REPEAT 5

In this example, the first record is a dynamic send. It causes DXC test tool 100 to send a keep-alive command every 30 seconds throughout execution of the script. The (expected response) field represents the response that is expected for each keep-alive command sent.

The second record causes DXC test tool 100 to send a cross-connect command for each pair of ports in a range. A command will be sent to cross-connect port 1 to port 11, then another command will be sent to cross-connect port 2 to port 12, and so forth, until a fifth command is sent to cross-connect port 5 to port 15. Prior to sending out each successive command, a response will be received for the previous command.

The third record causes DXC test tool 100 to send a disconnect command for the same range of ports as the second record.

The fourth record causes DXC test tool 100 to repeat the script five times. This repeat is performed for the SEND commands and not the directives. Therefore, the second and third records will be repeated five times. However, in accordance with the DSEND directive in the first record, DXC test tool 100 will continue to send a keep-alive command every 30 seconds throughout execution of the script.

The actual sequence of events carried out by the DXC test tool 100 as script processor 300 executes the above four records as shown in detail in the Script Record Execution process 700 (FIGS. 7A–7C).

In step 702, Script Processor 300 reads and loads a first directive from the first record. The first directive causes DXC test tool 100 to dynamically send keep-alive commands. In step 704, DXC test tool 100 sends the first keep-alive command and continues sending keep-alive commands at 30 second intervals according to the interval specified in the first directive read and loaded in step 702.

Script Processor 300 then loads the expected response contained in the first directive for the first keep-alive command into buffer 1 (step 706). Script Processor 300 then proceeds to read to second cross-connect command record and loads a range given in the cross-command record to memory (step 710). In this case, the range designates ports 1–5 and ports 11–15. In step 712, Script Processor 300 loads the expected response for the second cross-connect command to buffer 2 (step 712).

In step 716, Script Processor 300 sends cross-connect command to connect the first ports in the range port 1 to port 11. In step 718, DXC test tool 100 receives a response from a DXC to the first keep-alive command sent in step 704. A message representing the response received is written to the communication trace log.

In step 720, Script Processor 300 compares the response received to the expected response stored in buffer 1. A check is made to determine if the response received matches the expected response (step 720). If the received response matches the expected response, the expected response is cleared from buffer 1 (step 724). If the buffer 1 match fails, the received response is compared to the expected response stored in buffer 2 (step 726). A check is made to determine if the received response matches the expected response stored in buffer 2 (step 728). If the received response matches the expected response in buffer 2, the expected response in buffer 2 is cleared (step 730). If the received response does not match the expected response in buffer 2 indicating an unexpected response has been received, the unexpected response is written to an analysis log (step 732).

At some point during script record execution, a response is received from a DXC to the first cross-connect command sent in step 710. When a response to the first cross-connect command is received, a message representing the response is written to the communication trace log (step 734). In step 736, the response to the first cross-connect command is compared to the expected response in buffer 2 (step 736). A check is made to determine if the received response matches the expected response stored in buffer 2 (step 740). If the received response matches the expected response, the expected response is cleared from buffer 2 (step 742). Otherwise, the unexpected response, which does not match the expected response, is written to an analysis log (step 744).

In step 746, DXC test tool 100 sends a cross-connect command to connect the next ports 11–15 in the range given in the second command record. Script Processor 300 loads the expected response to the cross-connect command into a next or available buffer (step 748).

At some point during script record execution, a response to the second cross-connect command is received from the DXCs. DXC test tool 100 then writes a message representative of the response to the communication trace log (step 752). In step 754, the received response is compared to the expected response stored previously in the next buffer in step 748. As shown in FIG. 7C, a check is again made to determine if the received response matches the expected response (step 756). When the received response matches the expected response, the expected response is cleared from the next buffer (step 758). Otherwise, the response which is indicative of an unexpected response, is written to an analysis log (step 760).

In step 762, a check is made to determine if the end of the range for cross-connecting of ports 1 to 5 to ports 11 to 15 is reached. If the end of the range is not reached, Script Processor 300 continues to process the next command (step 764). In this case, Script Processor 300 returns to perform step 746 as described above. When the end of the range is reached, Script Processor 300 continues to read the next command record.

In step 766, Script Processor 300 reads the third command record (disconnect) and loads the range designated therein into memory. This range covers ports 1–5 and 11–15 in this example.

Script Message Processor 300 processes the disconnect command similar to the processing of the connect command record described above with respect to steps 746–764. In step 768, Script Processor 300 causes the DXC test tool 100 to send successive disconnect commands for each of the ports in the ranges 1–5 and 11–15. All responses received are compared with expected responses and buffers as described above with respect to steps 746–764. A check is made in step 770 to determine if the end of the range for the disconnects is reached. When the end of the range is reached, Script Processor continues and reads the repeat directive in the fourth command record. The repeat directive in the fourth command record is set to a value of five. This causes the Script Processor 300 to set a repeat counter to five. Each time the scripts (commands 1–3) are executed, the repeat counter is decremented. When the repeat counter does not exceed five, Script Processor 300 returns to the beginning of the script record to repeat execution of the script (step 774). The DXC test tool 100 continues to send keep-alive commands every 30 seconds processes steps 718 to 732. In addition, logical cross-connect and disconnect commands are sent according to the command records in the script.

In step 772 when the check determines that the repeat counter does exceed five, Script Processor 300 proceeds to end (step 776).

This is simply an example of a sequence. Due to the nature of a testing scenario in which multiple DXCs and TMU 160s are operating independently, there is a degree of randomness in the sequence in which responses are received by DXC test tool 100. DXC test tool 100 is capable of receiving and analyzing responses that are received out of sequence. However, in the cross-connect and disconnect range commands of the above example, DXC test tool 100 must receive a response to each command sent before sending the next command in the range. In the case of a response time-out, processing will precede as indicated in the SEND Action field.

It is assumed that the Action field in each command record in the example to diagram FIGS. 7A–7C is set to "continue with next record", such that if a response received does not match with the expected response, script processing continues with the next record.

Although separate components are shown to represent memory buffers for different expected responses, it is understood that once an expected response is cleared from its memory buffer, that buffer may then be used for another expected response. A buffer is simply a temporary allocation of a computer's memory.

Example Test Tool Implementation

FIGS. 8 to 18 illustrate one example implementation of DXC test tool 100 according to the present invention. The example implementation is illustrative and not intended to limit the present invention. Given this description, other equivalent structures and functions for each element of this example test tool implementation will be obvious to one of skill in the art.

a. Computer Environment

Figure 8:
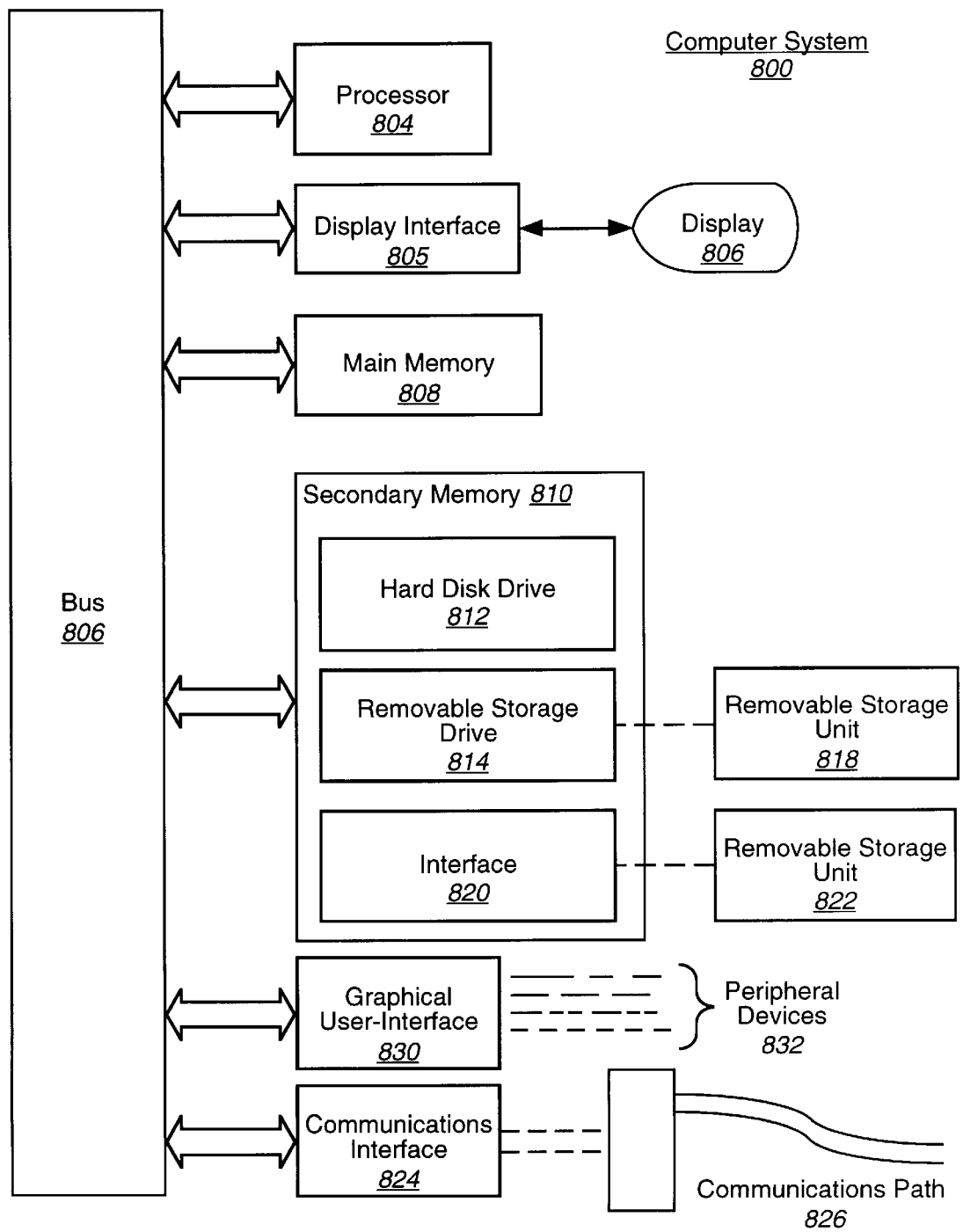
FIG. 8 is a block diagram of an example computer system for implementing a DXC test tool according to the present invention.

FIG. 8 illustrates an example computer embodiment implementing DXC test tool 100 according to the present invention as described above. As described above the DXC test tool 100 can be implemented primarily in software, hardware, and/or firmware, and any combination thereof.

FIG. 8 is a block diagram illustrating in more detail an example computer system 800 in which the present invention can operate. Computer system 800 includes one or more processors, such as processor 804. The processor 804 is connected to a communications bus 806.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818 represents a floppy disk, magnetic tape, optical disk, etc., which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means can include, for example, a removable storage unit 822 and an interface 820. Examples can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices via communications path 826. Examples of communications interface 824 can include a modem, a network interface (such as Ethernet card), a communications port, etc. Software and data transferred via communications interface 824 are in the form of signals which can be electronic, electromagnetic, optical or other signals capable of being received by communications interface 824, via communications path 826. Note that communications interface 824 provides a means by which computer system 800 can interface to a network, such as, the Internet.

An optional graphical user interface module 830 transfers user inputs from peripheral devices 832 to bus 806. These peripheral devices 832 can be a mouse, keyboard, touch screen, microphone, joystick, stylus, light pen, or any other type of peripheral unit.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 6. In this document, the term "computer program product" is used to generally refer to removable storage device 818 or a hard disk installed in hard disk drive 812. These computer program products are means for providing software to computer system 800.

Computer programs (also called computer control logic) are stored in main memory and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812 or communications interface 824. Alternatively, the computer program product may be downloaded to computer system 800 over communications path 826. The control logic (software), when executed by the processor 804, causes the processor 804 to perform the functions of the invention as described herein.

Various software embodiments are described in terms of this example computer system. After reading this description, it will be apparent to a person skilled in the relevant art how to implement the invention using other computer systems and/or computer architectures.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

b. Hardware Requirements

In general, DXC test tool 100 can be implemented on any computer system 800 as described above. A stand-alone personal computer (PC) system is preferred, however, as such platforms are relatively inexpensive and widely available. In one preferred implementation, DXC test tool 100 is run on an IBM-compatible PC with an Intel-486, 66-MHZ processor with an ISA or EISA bus to accommodate communication cards. Recommended memory requirements are 16 Mb RAM to support an IBM OS/2 operating system and 320 Mb to 2 Gb of memory on a hard-disk drive. Workstation configuration preferably includes a Super VGA (640× 480) monitor, keyboard, and Microsoft compatible mouse with a 7.04 driver. Six- 16 communications port cards (six open ports) is recommended to support ports 101–105. As would be apparent to one skilled in the art, these PC hardware requirements are illustrative. Macintosh-compatible PCS, faster processors, increased memory arrangements, and higher resolution displays can be used to improve performance. Likewise, inexpensive slower processors and hardware can be used in relatively simple applications.

c. Configuration

A number of data files are used to run the DXC test tool 100. These data files consist of a main Configuration file, a Screen Display file, Single-Message files (ASCII and Binary), and log files (Trace, Diagnostic, Filter) as shown in the following table:

| File | Description |
| --- | --- |
| DXCTOOL.CFG | Communication Configuration data. |
| ASCII.SCR | File containing ASCII screen configurations. |
| ASCII.MSG | Data tile containing the default ASCII message formats. |
| BINARY.MSG | data file containing the default binary message formats. |

-continued

| File | Description |
| --- | --- |
| TRACELOG.DAT | data file containing the Trace Log data. |
| DIALOG.DAT | Data file containing the Diagnostic Log data. |
| FILTRLOG.DAT | Data file containing filtered results data. Recreated during each run of the tool. | i. Communication Configuration Data File

The Communication Configuration Data File contains communication parameters for each DXC that is being connected and tested. The format and definition of each parameter are shown below. Each parameter is separated by a ',' (comma). A placeholder is provided for every parameter even if that particular parameter does not belong to the connection (e.g., the DTE address fields in an RS-232 connection). If the parameter is not needed, the placeholder for that parameter is simply left empty.

Example DXC Configuration Record

DXCName, NodeID, LocalDTE, RmtDTE, Transmit, QBIT, Card#, Link, Type, CH

| Column Name | Format | Length |
| --- | --- | --- |
| DXCName | Alphanumeric | 6 |
| NodeID | Numeric | 3 |
| LocalDTE | Numeric | 15 |
| RmtDTE | Numeric | 15 |
| Transmit | Alpha | 3 |
| QBIT | Alpha | 3 |
| Card# | Numeric | 1 |
| Link | Alpha | 1 |
| Type | Alpha | 3 |
| CH | Numeric | 2 |

Legend

DXCName—an alphanumeric name given to the connected DXC for identification purposes. This name is used for internal processing and user displays. Possible values are any alphanumeric combination, up to 6 characters (e.g., BAL AA DXC1, etc.).

NodeID—numeric Node ID of connected DXC used for internal identification of the DXC during processing, and for user displays. Any ID should be allowable. Possible values are a 3 digit number, including leading zeros.

LocalDTE—Local DTE address/PVC number used for X.25 communication connections. Each DXC has its own Local DTE address/PVC number that tells the communication card which circuits are available for which DXC. The DTE address is used for the Switched Virtual Circuits (SVC) on the DSC DXCS. The Permanent Virtual Circuit (PVC) number is used for certain manufacturers, such as, Alcatel DXCs. Possible values are any number up to 15 digits in length.

RmtDTE—Remote DTE address/PVC number used for X.25 communication connections. This tells the Test tool to only accept messages from a connection with this number. The DTE address is used for the Switched Virtual Circuits (SVC) on the DSC DXCs. The Permanent Virtual Circuit (PVC) number is used for Alcatel DXCs. Possible values are any number up to 15 digits in length.

Transmit—Turn the connection to the DXC on or off. Software version of disconnecting the test tool from the DXC to run connectivity testing. Possible values are ON or OFF.

QBIT—The QBIT flag is for the X.25 communication interfaces. This tells the communication card whether it should negotiate during connection. Possible values are ON or OFF.

Card#—The number of the X.25 card over which the message for this particular DXC will be sent and received. The possible numbers are 1 or 2 when two X.25 parts 101, 102 are used as in FIG. 1.

Link—Link (physical port) over which the messages for this particular DXC will be sent/received. Possible values for the Link are A (port 1 on X.25 card 1), B (port 2 on an X.25 card 1), or C (RS-232 connection).

Type—Type of circuit/channel. Possible values for Type are SVC or PVC for the X.25 communication card, and RS for the RS-232 connection.

CH—Channel number. Possible values 1 through 11. Note that each type of DXC or connection can have different ranges: e.g., 1 through 5 for an Alcatel DXC, 1 through 4 for a DSC 3/3 or 3/1 DXC, 1 through 1 for a DSC 1/0—all over the X.25 interface, and 1 for the RS-232 interface. The values for channels may also have ranges separated by '–' (e.g., 1–8).

EXAMPLE 1

AST AA, 005,100000000023012,002001, ON,OFF, 1, A,SVC, 1–3

EXAMPLE 2

DSC1, 125,,,ON,,,C,,1
Note that the Local and Remote DTE addresses, QBIT, Card#, and Type parameters are not needed in the second example.

ii. Display Screen Configuration Data File

The ASCII.SCR data file contains the configurations for the different screens that are displayed when the test tool is run.

iii. Single-Message Configuration Data Files

The ASCII.MSG and BINARY.MSG data files contain all of the messages that can be selected to be sent in single-message mode. The ASCII.MSG file contains all ASCII message types, including TL1 and PDS messages. The BINARY.MSG file contains only binary format messages. These messages are then displayed during single-message processing and can be selected by the user.

The message data files are modifiable by the user. Any new message set for any type of DXC can be added to these files. An easy way to save multiple message sets would be to create a message set data file with a particular set of messages for a particular DXC release, and when needed, rename that specific file to ASCII.MSG or BINARY.MSG for use in a test run.

iv. Log File Structures

There are three (3) database tables, TRACELOG, DIAGLOG, and FILTRLOG. These tables contain the message traffic, internal trace data, and unexpected results (error) data, respectively, captured during execution of the DXC test tool. The TRACELOG and DIAGLOG files will be provided with the test tool software. The FILTRLOG is created during each run of the test tool. The record structure and format of the data files is described below.

(1) TRACELOG

The TRACELOG file contains the interface traffic between the TMU, DXC, and the DXC test tool. This consists of the command sent out from the DXC test tool, and the response received from the connected DXC(s) and TMU(s). Note that the data fields that exist in the TRACELOG are permanent. The user cannot select what data is contained in the log file. It was constructed this way to allow all of the data for a particular run of the test tool to be saved. This allows the user to have access to all pertinent data, regardless of the outcome of the run. For example, a run is performed and the user selected only to have summary-type data saved. If no errors showed up, then that data will be suitable for analysis. However, if for some reason, errors started appearing, the run would likely have to be redone to capture additional data for analysis. This means that a test that took 2 days to run would be useless, and the test would have to be run again.

The information that is printed to the log file during a script run will be separated into three different types: script header information, message processing data, and directive changes.

(a) Script Header

| SCRIPT HEADER | | |
| --- | --- | --- |
| Column Name | Format | Length |
| Script Name | AlphaNumeric | 12 |
| Script Equivalent | Alpha | 2 |
| Script Description | Alpha | 54 |

Legend

Script Name—Name of the script—that is currently running.

Script Equivalent—Short script name equivalent that will show from which script a particular message was processed, and can be used to sort the log file by script. It is used, for example, during stress testing when multiple scripts are run simultaneously.

Script Description—54-character description that the script writer has inserted into the script. This will be pulled from the script file and written to the log file.

EXAMPLE

SCRIPT4B.SPT—A1 Test GRTH and DGRTH commands on successive ports.

(b) Message Processing Data

The majority of the data in the log file will be script message processing data. It consists of the results, the message throughput duration, the command and the time it was sent, the response and the time it was received. Optionally, the user may select to have the actual command syntax from the script file inserted to make sure that the actual command sent matches what was in the script file, and the actual expected response syntax from the script file may be inserted to determine what the error was in the actual response.

| MESSAGE PROCESSING DATA | | |
| --- | --- | --- |
| Column Name | Format | Length |
| Results | Alpha | 1 |
| Duration | MM:SS.hh | 8 |
| Message Format | A/B | 1 |
| Script Command | AlphaNumeric | (Message Length) |
| Actual Command | AlphaNumeric | (Message Length) |
| Initial Send Time | Numeric | 11 |
| Script Response | AlphaNumeric | (Message Length) |
| Actual Response | AlphaNumeric | (Message Length) |
| Initial Receive Time | Numeric | 11 |

Legend

Results—Results of the message send/received process: '.' means the results were good. 'F' means it failed.

Duration—Different between the time the command was actually sent out and the time the initial response was received. The values are displayed as hundredths of a second, but optionally can be displayed in shorter time intervals, e.g. milliseconds.

Message Format—Flag showing the format of the message. A for ASCII, B for Binary.

Script Command—The Command from the script that was sent prior to parameter substitution.

Actual Command—The command with parameter substitution that is actually sent out. This should match the Script Command.

Initial Send Time—Time the message is actually sent out over the connection. As soon as the 'SEND' command is processed, the timer will be started. Format is HH:MM:SS.hh.

Script Response—Response from the script file. This is the response that the user expected to receive for the command sent.

Actual Response—Response that is actually received. This should match the Script Response.

Initial Receive Time—Time the message is actually received over the connection. As soon as the 'RECEIVE' command is processed, the timer will be stopped, regardless of how many additional lines are in the response, or how long the rest of the message actually takes to be received. Format is HH:MM:SS.hh.

ASCII Example

00:00.03 A GRTH NPC 0057 GRTH NPC 0057 09:03:12.05 GRTH NPC 0057 COMPL GRTH NPC 0057 COMPL 09:03:12.08

Binary Example

00:00.02 B 01070001001 01070001001 09:03:12.05 01080001001 01080001001 09:03:12.07

(c) Directive Changes

The final part of the data in this file consists of directive changes. These are changes in the script processing that will show where in the script the processing is currently.

| DIRECTIVE CHANGES | | |
| --- | --- | --- |
| Column Name | Format | Length |
| Directive | Alpha | 20 |

Legend

Directive—Command to the script file that forces changes to the processing. The CH command will cause a script to loop back to the beginning from the end and rerun the script with the next channel in the range. This will be shown in the log file to show which channel is currently being used. The REPEAT directive, which causes the script to repeat itself the specified number of times, will be displayed in the log file to show which iteration the repeat directive is currently processing, and the number of iterations specified by the user.

Example

REPEAT 2 (4)

(2) Diagnostic Log

The Diagnostic Log (DIAGLOG) file contains the application program self-diagnostic trace data that is collected during processing. This data consists of debug-like data that will be used in the event that an error occurs with the DXC test tool. This data will be used to determine where the problem occurred in the software, and what processing was happening when the error was found.

DIAGNOSTIC LOG FILE

| Column Name | Format | Length |
|---|---|---|
| Date | YYMMDD | 6 |
| Time | HH:MM:SS.hh | 11 |
| Message | Text | 54 |

Example 951214 18:42:26.31 DXC test tool Starting.

(3) Filter Log

The Filter Log (FILTRLOG) file contains a summary of all commands processed during a run of a single script (see the real-time Summary Report described below), and a list of the commands sent out that received unexpected (usually error) results. The output data will also include any directive that was in effect at the time of the error.

FILTER LOG

| Column Name | Format | Length |
|---|---|---|
| Directive | Alpha | 20 |
| Results | F (Fail) | 1 |
| Duration | MM:SS.hh | 8 |
| Actual Command | Alphanumeric | (Message Length) |
| Initial Send Time | HH:MM:SS.hh | 11 |
| Actual Response | Alphanumeric | (Message Length) |
| Initial Receive time | HH:MM:SS.hh | 11 |

ASCII Example

CH C 1 F 00:00.03 GRTH NPC 0057 09:03:12.05 XXXXXXXXXXX 09:03:12.08

Binary Example

CH C 1 F 00:00.02 01070001001 09:03:12.05 XXXXXXXXXXX 09:03:12.07 d. Display Interface

Most navigation through the user-interface is performed using a mouse to point and click on the user specific options presented in different display screen menus. This intentional design reduces the number of transitions between the mouse and keyboard which reduces user interaction.

i. Main User-Interface Display

Figure 9:
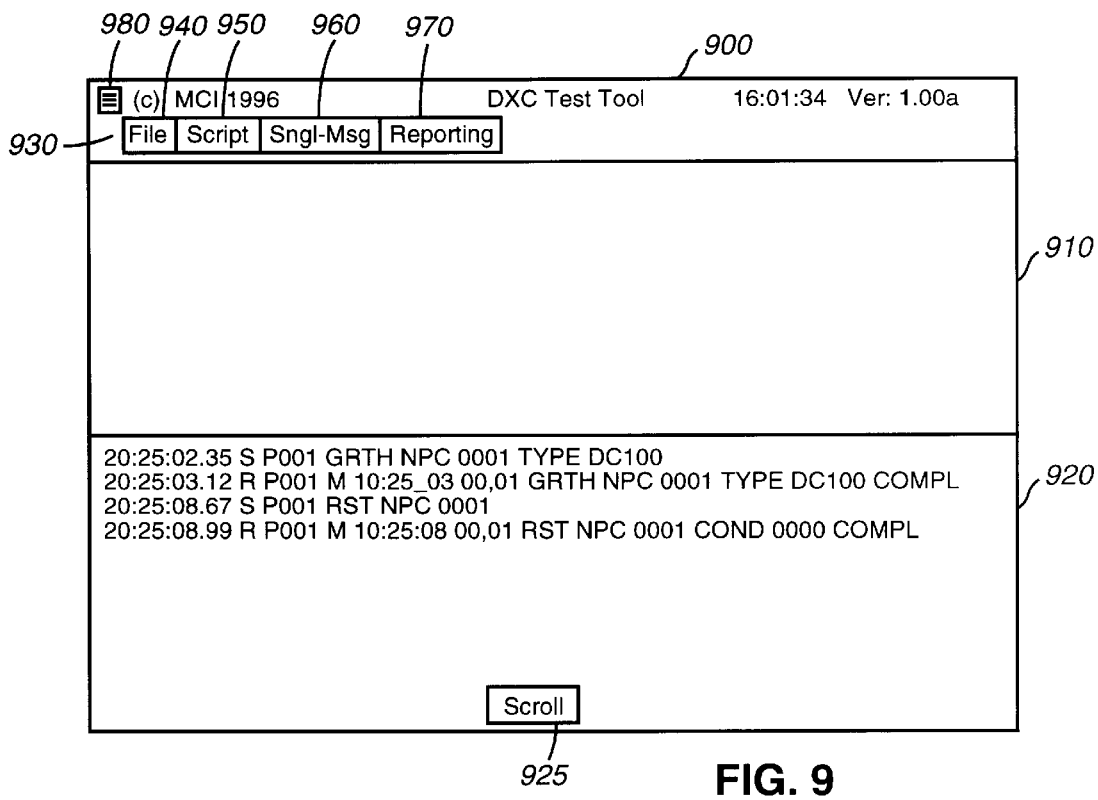
FIG. 9 shows a main user interface display used in one example DXC test tool implementation according to the present invention.

FIG. 9 shows the main user-interface UI display 900. The display 900 is divided into two halves 910, 920. The top half 910 is used for user control, the bottom half 920 provides a real-time display of all outbound and inbound communication messages. A control bar 930 located in the top half 910 for controlling DXC test tool 100. Control bar 930 includes four pull-down menus: File Menu 940, Script Menu 950, Single Message 960, and Reporting Menu 970. The operation of each of these menus is described in further detail below. Exit button 980 (three horizontal lines icon) exits the DXC test tool 100 when pressed.

Clicking on the File Menu 940 displays a drop-down list box which allows the user to select Trace Log, Diagnostic Log, Binary Format, and Exit options.

Clicking Script Menu button 950 displays a Script List window showing a list of all script files in a DXC test tool directory. From the Script List window the user can select a script to be run.

Clicking the Single Message button 960 displays a list of user predefined ASCII or binary messages. A message can be selected, modified and sent to the attached DXC device or devices under test.

The Bottom half of the screen is the real-time window 920. It shows all messages as they are sent and received. Preferably, different colors are used for different types of messages. Messages sent are displayed in white. Messages received are displayed in yellow. Errors are displayed in red.

Four example messages are shown in window 920. Each message has four fields: Time, Send/Receive, Port, and Message.

MESSAGE

| Field | Descriptions |
|---|---|
| Time | The beginning time of a message transmission or the beginning time of receipt of a message response, represented in HH:MM:SS.hh (Hours:Minutes:Second.Hundreds of Seconds). |
| S/R | Send or Receive message indicator. |
| Port | Port number. |
| Message | Message content. ASCII messages are displayed "as-is". Binary messages are displayed based on a user specified format. |

Clicking on the Scroll/Freeze button 925 allows the user to toggle between scrolling and freezing mode on the real-time screen 920. Messages are not buffered in freeze mode so as not to impede performance. Messages that are not seen while in freeze mode, can be viewed in the communication log. When the display is reverted from freeze mode to scroll mode, the display resumes with the current communication activity.

ii. File Menu

Figure 10:
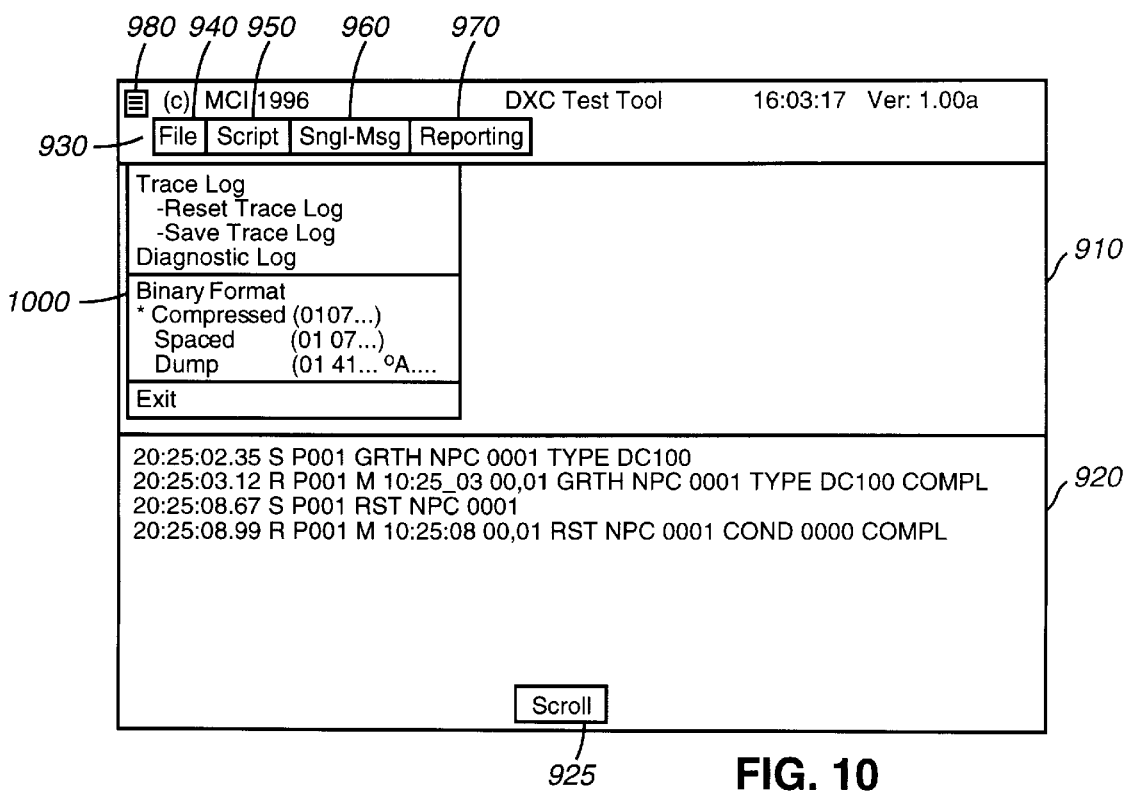
FIG. 10 shows a file menu used in the main user interface display of FIG. 9.

As shown in FIG. 10, clicking on File Menu button 940 displays a drop down list box 1000 where the user can select from the following options: Trace Log, Reset Trace Log, Diagnostic Log, Binary Format (Compressed, Spaced, Dump), and Exit.

Selecting the Trace Log option causes the Trace Log window to be displayed. Selecting the Reset Trace Log option replaces the existing Trace Log file with a new, empty one. Selecting the Save Trace Log option allows a user to name and save the Trace Log file. This feature allows a user to segment test scripts or scenarios. A Trace Log display is described further with respect to FIG. 11.

Selecting the Diagnostic Log option causes the Diagnostic Log window to be displayed. A Diagnostic Log Window is described further with respect to FIG. 12.

The three Binary Format options determine how binary messages will be displayed on the Real Time screen 920. Selecting one binary format option deselects the previous choice. Unprintable binary characters will be replaced by a "°". Each binary byte is represented by two ASCII characters. The compressed format prints out binary messages without any spaces.

The Compressed format prints out binary messages without any spaces. Example: ▌ 2800574243434E5433010533▌ . The spaced format prints out binary messages in hexadecimal with spaces between every bite. Example: ▌ 28 00 57 42 43 43 4E 54 33

01 05 33█ . The Dump format prints out 12 bytes of binary data in hexadecimal with spaces between every byte followed by ASCII representation of the same data. Example: █ 28 00 57 42 43 43 4E 54 33 01 05 33 (°°WBCNNT3°°3█ ).

Finally, selecting the Exit option exits the DXC test tool 100.

1) Trace Log

Figure 11:
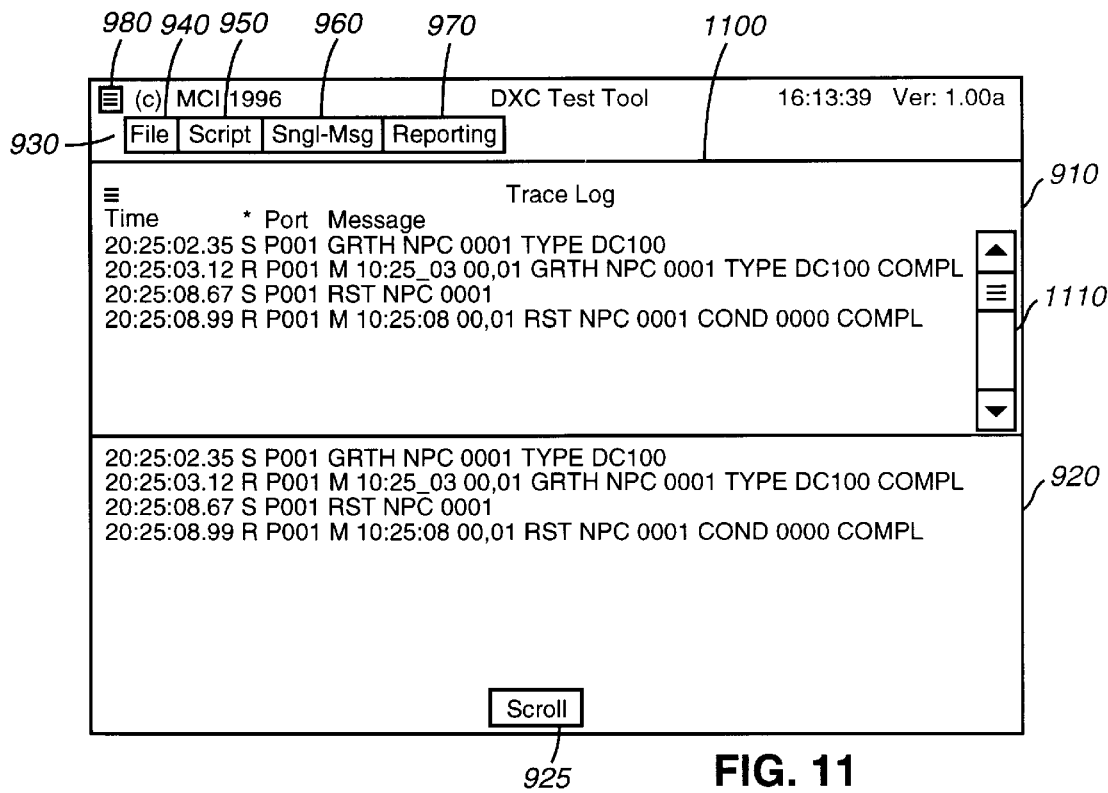
FIG. 11 shows a trace log display selected from the file menu of FIG. 10.

As shown in FIG. 11, Trace Log display 1100 displays the Trace Log file showing all messages that have been sent or received by the DXC test tool since the last refresh of the file. All four fields of such messages (Time, S/R, Port, Message) as described earlier, are displayed.

The user can scroll through the Trace Log file by using a scroll bar 1110. Clicking on top or bottom down "arrows" scrolls to the beginning or the end of the file, respectively. Clicking up and down "triangles" (not shown) scrolls one line at a time. The user can page up or down by clicking on the scroll bar either above or below the scroll marker.

(2) Diagnostic Log Display

Figure 12:
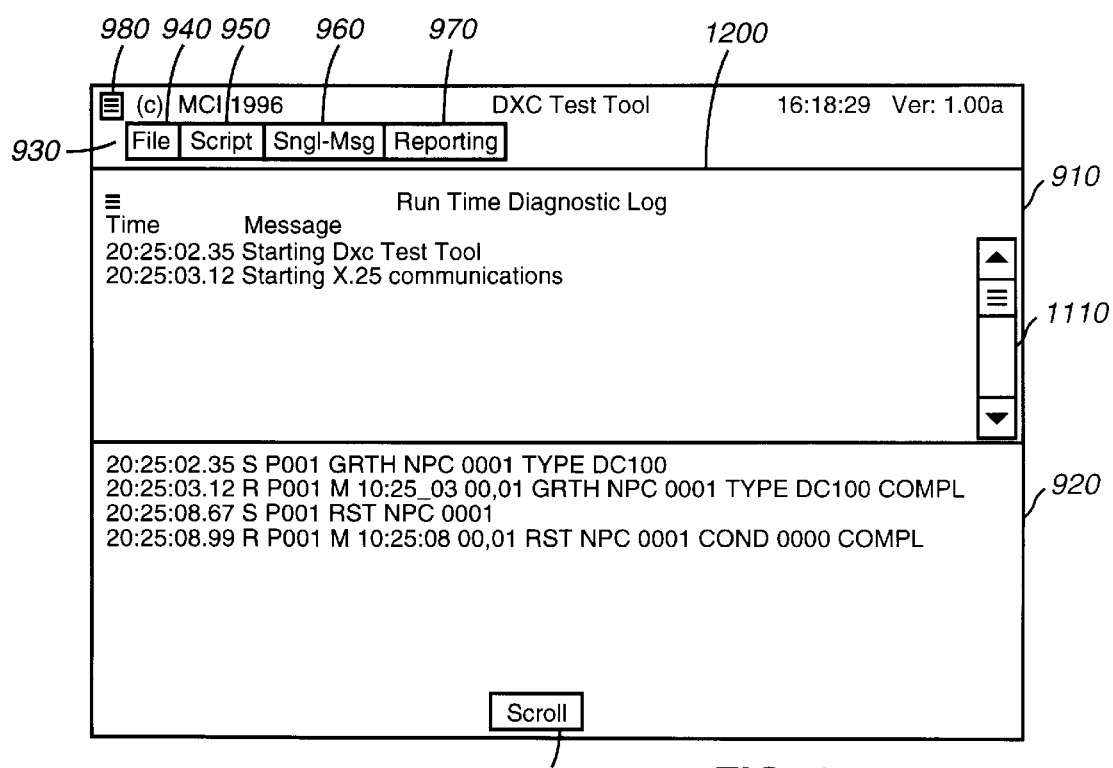
FIG. 12 shows a diagnostic log display selected from the file menu of FIG. 10.

As shown in FIG. 12, Diagnostic Log display 1200 displays the Run Time Diagnostic Log file showing a trace of the application program processing during program execution of the DXC test tool 100.

A user can scroll through the Diagnostic Log file using the scroll bar 1110 as described earlier with respect to the Trace Log Display 1100.

The messages in the Run-Time Diagnostic Log display 1200 have two fields: Time and Message. Time is a datestamp given the message when it is generated and is generally represented in HH:MM:SS.hh. Message is the message content which usually indicates an unexpected problem and other useful diagnostic information such as: starting DXC test tool time, starting X.25 communication time, and terminating DXC test tool time.

iii Script Menu (1) Script Selection Display

Figure 13:
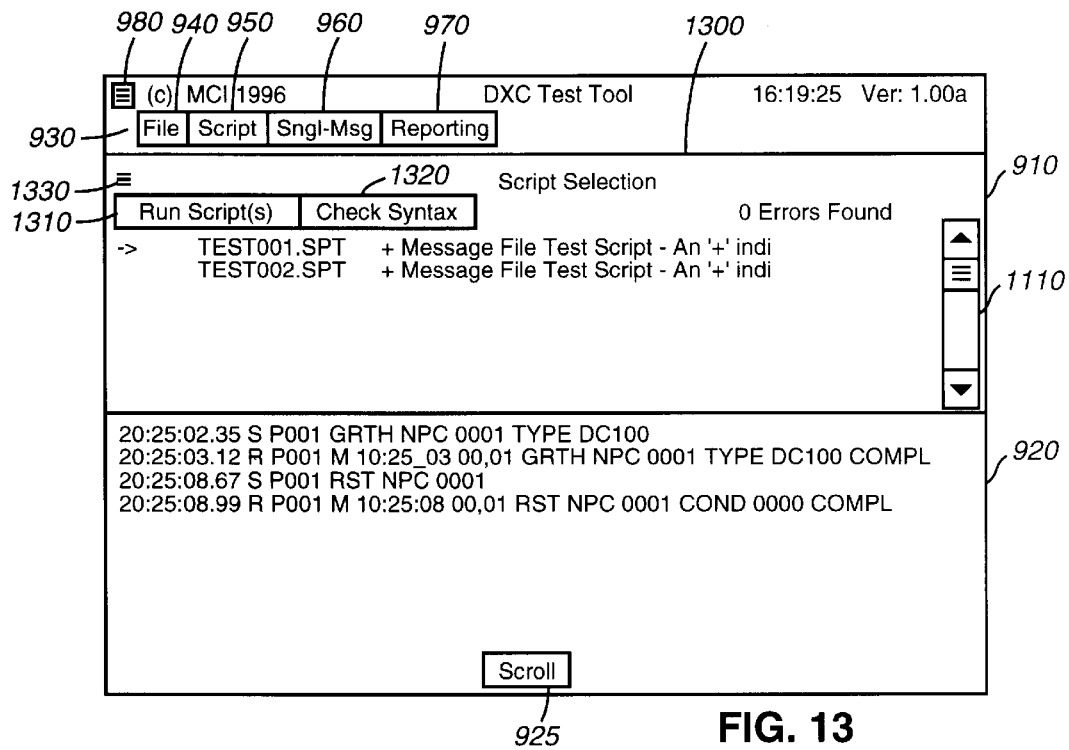
FIG. 13 shows a script selection display selected from a script menu in the main user interface display of FIG. 9.

As shown in FIG. 13, clicking on the Script Menu button 950 brings up a Script Selection display 1300. In this example, display 1300 lists two available scripts which can be run to test DXC test tool 100. Clicking anywhere on a line in display 1300 with the name and description of a script file highlights that line as indicated by an arrow (hyphen-greater than sign).

Two control buttons 1310 and 1320 are provided in display 1300. Clicking on the Run Script(s) button 1310 displays a window which shows the contents of the highlighted script file. Clicking on the Check Syntax button 1320 allows the user to test the syntax of the script file before attempting to run it. The number of errors found is displayed at the top, right of the window 910. The user can scroll through the list of script files by using scroll bar 1110.

(2) Run Script Display

Figure 14:
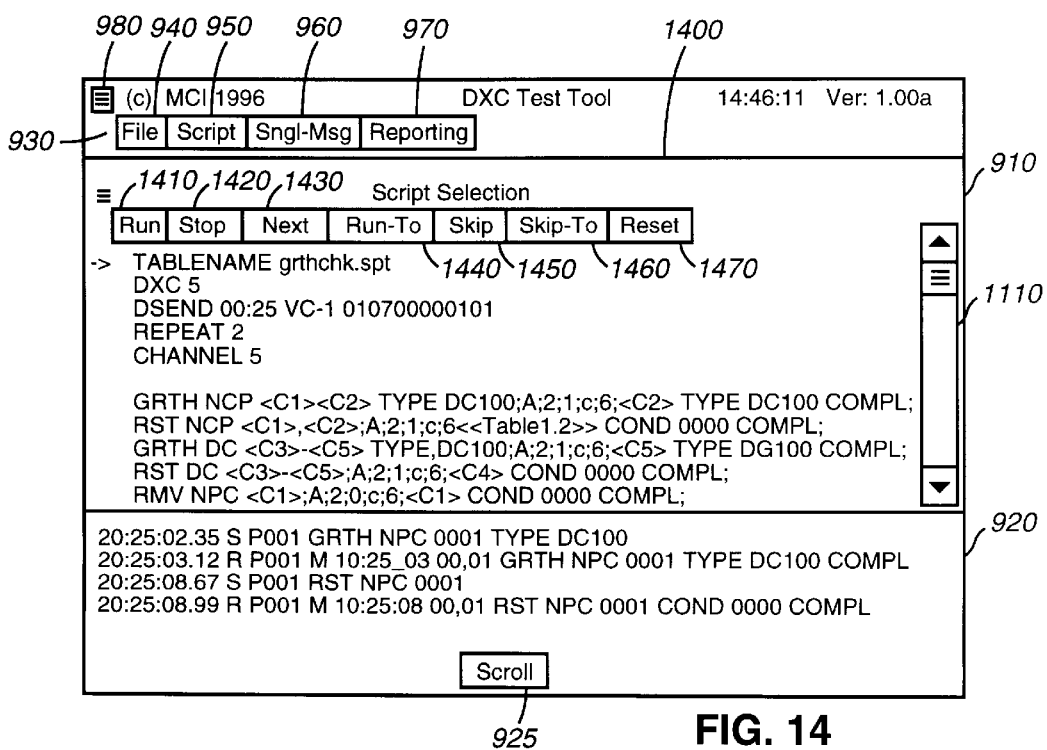
FIG. 14 shows a run script display selected from a script menu in the main user interface display of FIG. 9.

In another feature of the present invention, run script display capability provides interactive and dynamic script execution. As shown in FIG. 14, clicking on the Run Script(s) button 1310 from the Script Selection window 1300 displays the Run Script window 1400.

Clicking anywhere on a line in display 1430 highlights the line with an arrow. Seven control buttons 1410–1470 are provided in display 1400. Clicking on the Run button 1410 causes the script to start executing beginning with the highlighted line. Clicking on the Stop button 1420 causes the execution of the currently running script and all current scripts to end. This is useful when inside a long-running script (often used for stress and stability testing).

Clicking on the Next button 1430 causes the current highlighted line to be executed. This includes comments. Clicking on the Run To button 1440 causes the script file to be processed, beginning with the current highlighted line, and stopping on the marked line. Clicking on the Skip button 1450 causes the current line to be skipped (not executed). Clicking on the Skip To button 1460 causes lines in the script file to be skipped, beginning with the current highlighted line, until the marked line is reached, at which point, execution of the following lines begins.

Clicking on the Reset button 1470 causes script processing to be halted and all script processing specifications to be cleared and reset to the original default state. The user can scroll through the script file by using the scroll bar 1110.

iv. Single Message Menu

Figure 15A:
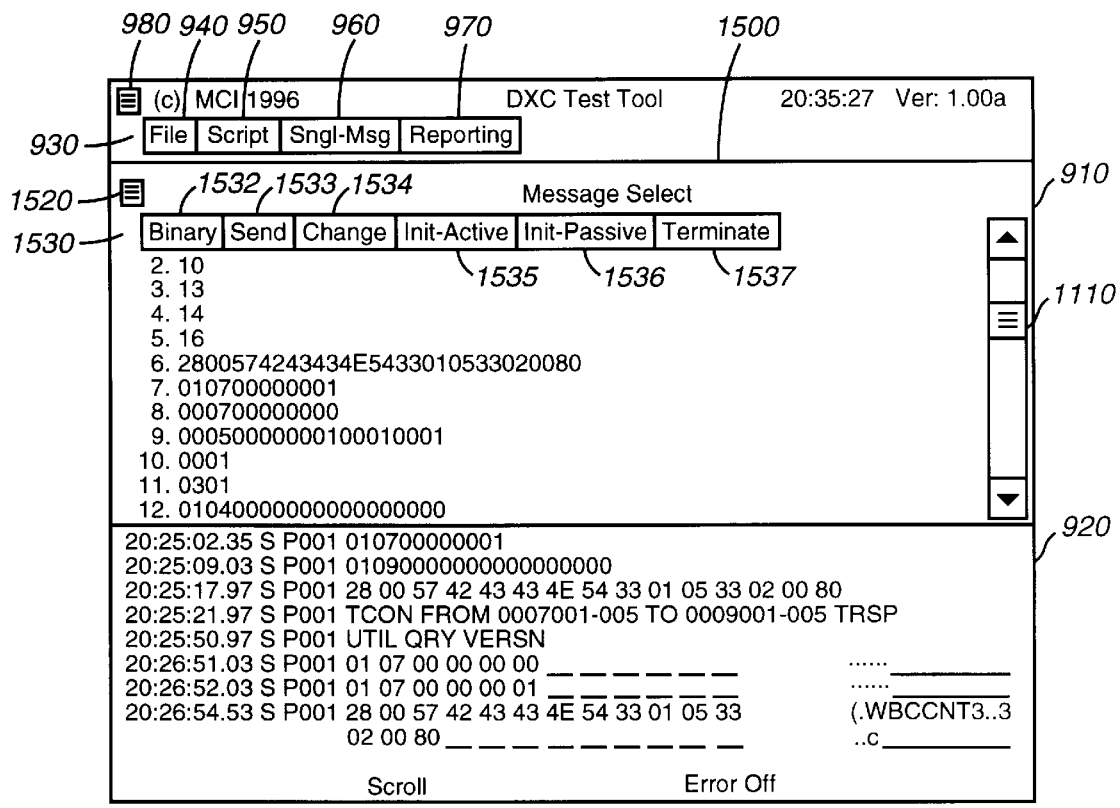
FIG. 15A shows a single message menu selected from the main user interface display of FIG. 9.
Figure 15B:
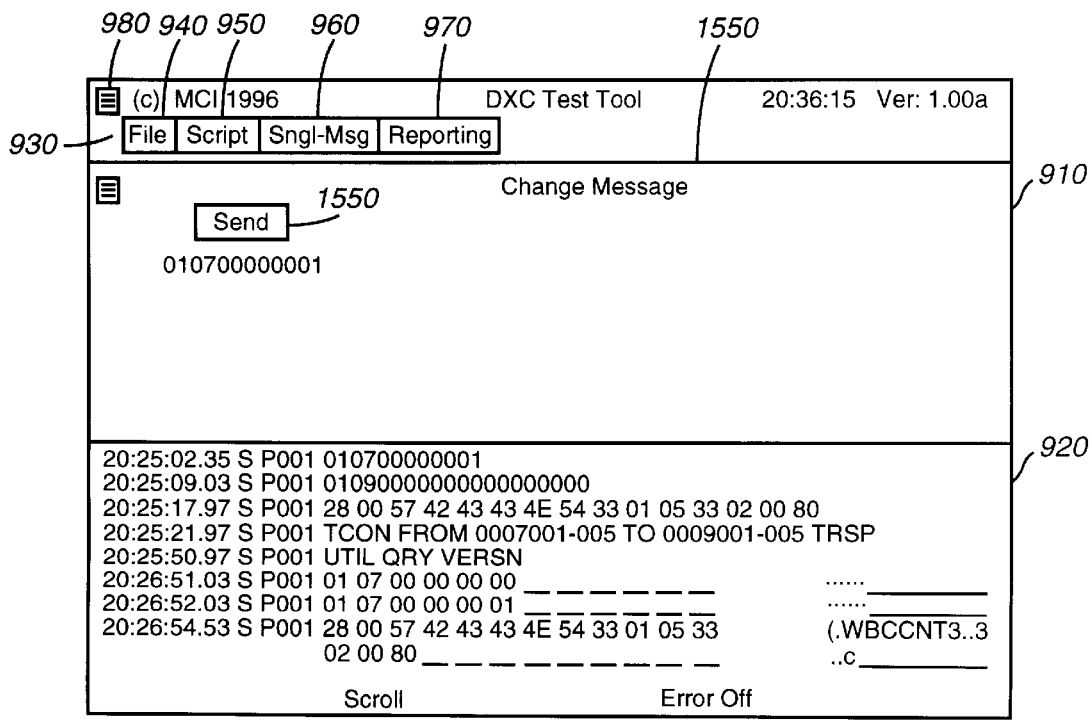
FIG. 15B shows a change message display window opened from the single message menu of FIG. 15A.

As shown in FIG. 15A, clicking the Single Message button 960 displays a Single Message Display 1500, also called the message selection display. Display 1500 lists user predefined ASCII or binary messages. Window 1510 shows an example listing of binary messages. A button 1520 can be pressed to close the Single Message Display 1500.

Display 1500 further includes a message selection control bar 1530 having six control buttons 1532–1537. Clicking ASCII/Binary control button 1532 allows a user to toggle between lists of ASCII or binary messages which are predefined by the user. Clicking Send button 1533 sends a selected message. Clicking Change button 1534 displays a separate Change Message window (FIG. 15B) that allows a user to modify a selected message. Changes can be typed into the Change Message window and then sent by pressing a send button in the Change Message window. Error off buttom turns off the display of error messages.

Clicking Initiate-Active session button 1535 establishes a connection (communication link) where a communication driver (e.g. an X.25 driver) assumes an active role. Clicking Initiate-Passive session button 1536 establishes a connection (communication link) where a communication driver (e.g. an X.25 driver) assumes a passive role. Clicking Terminate button 1537 closes any connection established on a current card and port.

v. Reporting Menu

Figure 16:
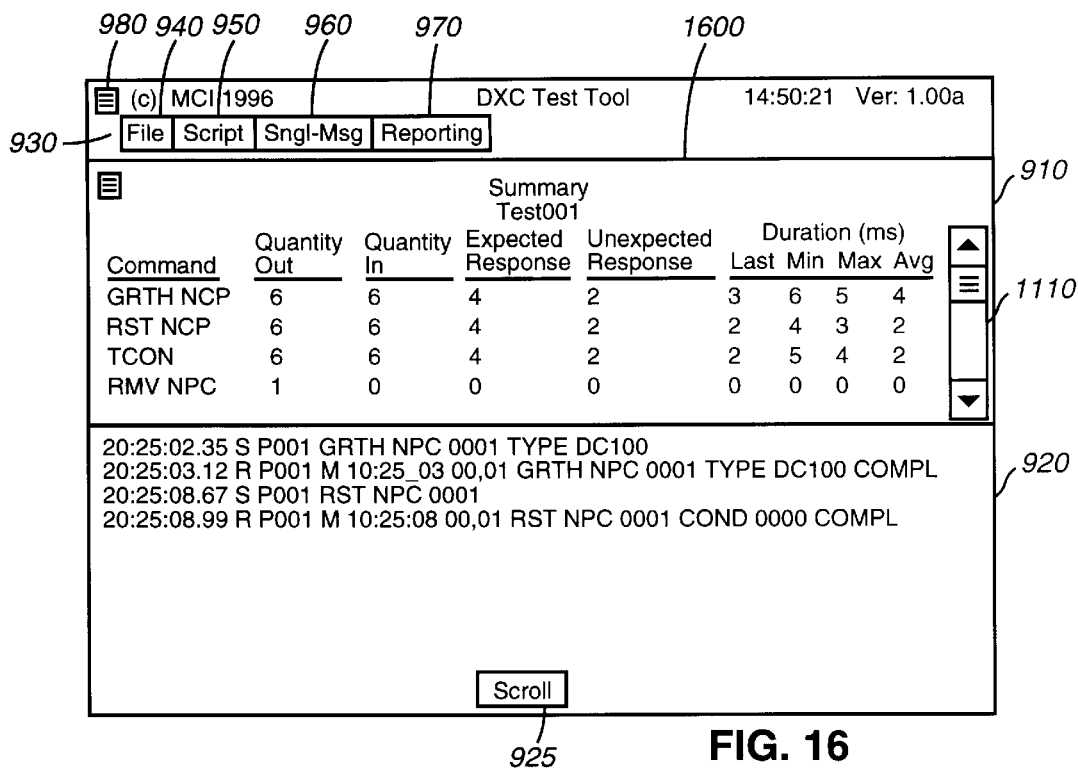
FIG. 16 shows a summary display selected from a reporting menu in the main user interface display of FIG. 9.
Figure 17:
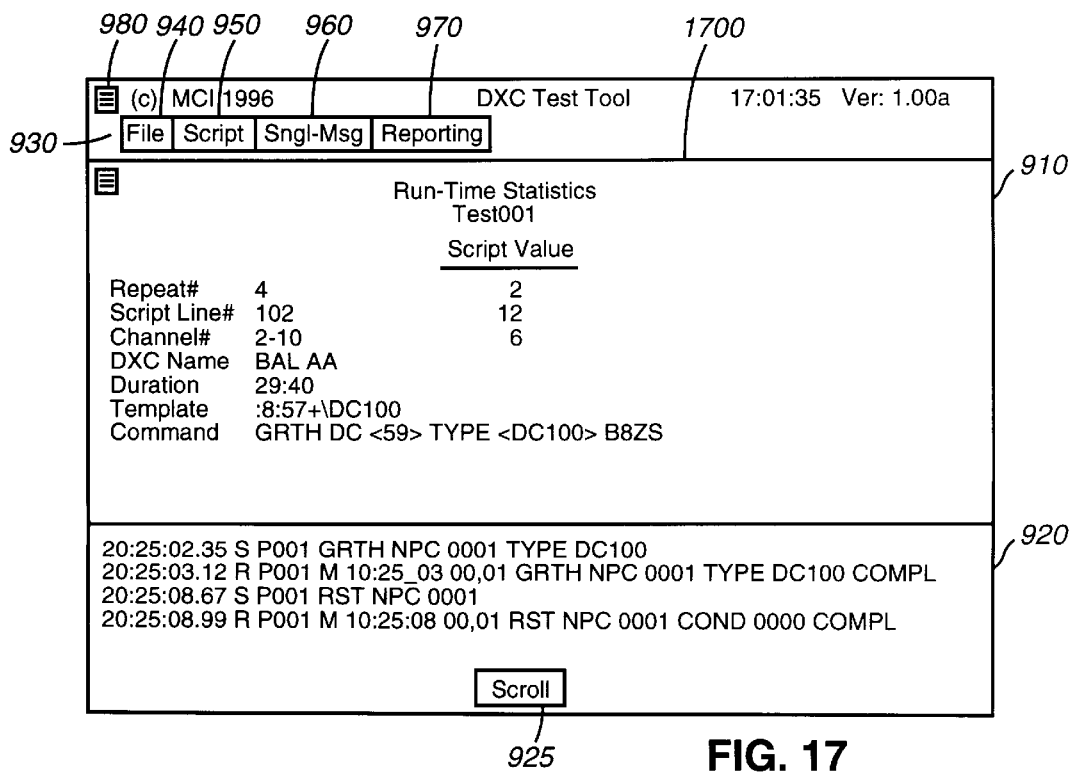
FIG. 17 shows a run-time statistics report display selected from a reporting menu of the main user interface display of FIG. 9.

Clicking on the Reporting Menu button 970 displays a drop down list box (not shown) where the user can select either a Summary option or a Run-Time Statistics option. Selecting the Summary option causes a Summary display window to be displayed. An example summary display 1600 is shown in FIG. 16. Selecting the Run-Time Statistics option causes a Run-Time Statistics display window to be displayed. An example Run-Time Statistic display 1750 is shown in FIG. 17.

(1) Summary Display

As shown in FIG. 16, the Summary Display 1600 displays a real-time report of the messages and frequencies of the messages sent to and from the DXC test tool 100 while processing a script. The Summary Display 1600 is updated continuously while the script is running. The user can scroll through the real-time report by using the scroll bar 1110.

A summary report, as shown in FIG. 16, has nine fields or columns for providing summary information on the test tool operation. The nine fields and their descriptions are listed in the following table:

| Field | Description |
| --- | --- |
| Command | The Command column dynamically displays all commands issued from within the current script. |
| Quantity In | The Quantity In column displays the total number of each command issued from within the current script. |
| Quantity Out | The Quantity Out column displays the total number of responses for each command issued from within the current script. |
| Expected Response | The Expected Response column displays the total number of responses that did match the expected response as defined in the script file and did receive the expected response before expiration of the 25 second timer. |
| Unexpected Response | The Unexpected Response column displays the total number of responses that did not match the expected response as defined in the script file or did not receive the expected response before expiration of the 25 second timer. |
| Duration-Last | The Last column displays the total time, in milliseconds, between the beginning of the transmission of the last message and the beginning of the receipt of the response for the last message. |
| Duration-Min | The Min column displays the minimum time, in milliseconds, between the beginning of the transmission of the message and the beginning of the receipt of the response for the message for all messages that have been sent and that have received a response. |
| Duration-Max | The Max column displays the maximum time, in milliseconds, between the beginning of the transmission of the message and the beginning of the receipt of the response for the message for all messages that have been sent and that have received a response. |
| Duration-Avg | The Avg column displays the average time, in milliseconds, between the beginning of the transmission of the message and the beginning of the receipt of the response for the message for all messages that have been sent and that have received a response. |

(2) Run-Time Statistics Report Display

As shown in FIG. 17, a Run-Time Statistics display 1700 displays statistical data on the processing of the currently running script. Display 1700 gives a window into the script processing showing where the processing is currently in the script, what values are being used in this iteration, and timing statistics.

Run-Time Statistics display 1700 includes a Script Value column that dynamically displays the corresponding values for Repeat#, Script Line#, and Channel#, during the processing of the current script. Repeat# is the value assigned to the "Repeat" directive at the beginning of the line number of the script line currently being processed. Channel# is the range of channels assigned by the "Channel" directive at the beginning of the script. The current channel value is displayed in the "Script Value" column. The Run-Time Statistics display 1700 also includes information on DXC Name, Duration, Template, and Command. DXC Name is the node ID of the DXC specified in the "DXC" directive at the beginning of the script. Duration is the total time elapsed since the start of the script processing. Template is the current values of the columns in the table line that is being processed in the script. Command is the script being executed with all table column values inserted in their appropriate places within the command.

e. Automated Run Capability

In order for the user to perform repeatable and complex scenarios, DXC test tool 100 has an Automated Run capability. Preferably, 'script' files can be selected and run from the tool User Interface. Using script files allows multiple levels of testing for each DXC. For example, the first level could be called 'exercise' testing. This consists of running a single script or set of scripts one time. It is the preliminary testing mode for a new piece of equipment. The next level would be 'stability' testing. This consists of running a single script multiple times. The final level would be 'stress' testing, which is running multiple scripts simultaneously over multiple circuits. These three steps would allow complete testing of any connected DXC device.

1. Script Data Tables

Each script may have a corresponding data table. These tables contain suitable values for designated areas in each script record. They allow a single script with a small number of commands to perform identical, repeatable processes against multiple ports, channels, etc. The name of the file containing the table data can be up to 8 characters in length, with the extension of '.TBL'.

(1) Data Records

Each data record in the table contains a list of values that can be substituted into selected areas in the script. A '/' separates each value in the data table and is also used to show the end of the record, and each value is entered in the exact format as needed in the script. The data in a record is used for one iteration of the script, i.e., the entire script will be run using the data from a single data record. The script will automatically repeat as many times as there are data records. If there are 2 records in the data table, the currently running script will repeat 2 times, the first time using the data from the first record, and the second time using the data from the second record.

Example

57/58/60/61/62/TC(0011,0011)TRB/

(2) Ranges

The ranges in the data table affect the number of times that the script is actually processed. Keeping in mind that the script will be repeated for each record in the data table, if a record has ranges in it, the script will be repeated for each number in the range. For example, if a data table has 3 lines of data (i.e., 3 records), the script will be repeated 3 times. However, if the first data record has a range of 1 to 4 in one of the values, the script will be repeated 4 times for the first record, substituting in the changing values, and then processing will go on to the second and then the third record. An example for a repeated data record is:

:repeat#: datavalue1*/datavalue2/datavalueN*/

:repeat#:—where repeat# equals the number of times to repeat the script using the range numbers in the particular record. The repeat# field is surrounded by colons.

datavalue1*—is a data field. This value with an '*' after indicates the start of the range for the repeats.

datavalue2—is a data field. Without the '*', this value will be used in all iterations.

datavalueN*—is a data field. This value with an '*' after indicates the start of the range for the repeats.

The following example would repeat the script 4 times using the values 57, 60, 62, and TC(0011, 0011)TRB in each iteration. In the first iteration, 58 and 61 (the fields marked for repeats) would be used. In the second iteration, 59 and 62 would be used. In the third, 60 and 63 will be used, and in the last (repeat#=4), 61 and 64 will be used.

Example

:4:57/58*/60/61*/62/TC(0011,0011)TRB/ ii. Script Data Insertion

Insertion of the data from the data tables described above can be used anywhere in a script line for any value. The format for insertion is:

GRTH NPC<C1>TYPE<C4>B8ZA . . . ;

where the insertion format <C1> tells the processing that the value should be retrieved from the associated script table, Column 1, and <C4> tells the processing that the value should be retrieved from Column 4. The data can be used in any order, and as many times as needed.

iii. Script Format (1) Directives

Directives are the commands in the script that tell the processing in the software how to proceed. These include looping directives like REPEAT, to determine how many times to repeat the current script (i.e., stability), the channel determination directive, CH, used to determine the number of channels the script should be run for over which link, and automatic messages. All directives are inserted at the top of the script file after the Description, which is described below. These commands affect the entire script file, not just a particular line.

(a) Dynamic Send (DSEND)

The DSEND command (Dynamic SEND) continually sends the specified message out over the selected channel for the specific DXC and link every specified time period. Six fields are used in a DSEND command. Each field is separated by a ';', including one at the end of the line as shown below.

| DYNAMIC SEND DIRECTIVES | | |
| --- | --- | --- |
| Column Name | Format | Length |
| DSEND | Alpha | 5 |
| Delay | MM:SS | 5 |
| DXCID | AlphaNumeric | 6 |
| Link | Alpha | 1 |
| Channel | Numeric | 5 |
| Message | AlphaNumeric | (Message Length) |

Example

DSEND;Delay;DXCID;Link;Channel[-Channel];Message;

The Delay field is the length of time the program will wait before sending out the specified message. The format for this is Minutes:Seconds (MM:SS). The range for minutes is 0–99, and the range for seconds is 0–59.

The DXCID is the name of the selected DXC from the configuration file. The DXCID can be up to 6 characters.

The Link field designates the link or connection over which the message will be sent. Link A is the first link (port) on the X-25 communication card. Link B is the second link (port) on the X.25 communication card. Link C is the RS-232 connection.

The Channel[-Channel] field identifies the channels that the message will go out over. This can be either a single channel for the selected DXC, or a range of channels. The range for each number is 0–11, however, keep in mind that the current total number of channels on a link for an Alcatel DXC is 5, and the current total for a DXC 3/3 or 3/1 is 4. The 11 channels refers to a DXC 1/0.

The Message field includes the specified message to send.

The power of the compact DSEND is evident in the following example. The following example causes a binary KEEPALIVE message to be sent out every 30 seconds for DXC1, over link A on channels 1 through 3, for as long as the script runs.

Example

DSEND;00:30;DXC 1;A;1–3;0107000000101

(b) Dynamic Receive (DRECEIVE)

The DRECEIVE directive (Dynamic RECEIVE) handles repetitive messages (ASCII or Binary) received by the DXC test tool such as unsolicited alarm messages sent from a DXC. Four fields are used in a DRECEIVE directive. Each field is separated by a ';', including one at the end of the line as shown below.

| DYNAMIC RECEIVE DIRECTIVE | | |
| --- | --- | --- |
| Column Name | Format | Length |
| DRECEIVE | Alpha | 8 |
| ASCII/BINARY | Alpha | 1 |
| Field N | Numeric | 3 |
| Expected Response | AlphaNumeric | (Message Length) |

DRECEIVE (8 characters) identifies the Dynamic Receive directive.

ASCII/Binary field is a one character field that determines whether to convert dynamically received command to a Binary format or leave in the ASCII format.

Field N are the offset(s) in a response to be examined.

Expected Response is the expected unsolicited message. The expected unsolicited message can be null.

When the DRECEIVE directive is read in a script, the script processor 300 allocates a new buffer that stores the expected response corresponding to unsolicited messages such as DXC alarm messages (e.g. buffer 3). Any message received by the DXC test tool is compared against other expected message buffers (e.g. buffers 1 and 2 above). These buffers are cleared if a received message matches the buffers (an expected response has been received).

If the received message is still not cleared it is compared to an allocated DRECEIVE buffer (e.g. buffer 3) holding the expected response from the DRECEIVE directive. If the received message does not match this allocated DRECEIVE buffer, then the message is an unexpected response. If the received match does match the contents of the allocated DRECEIVE buffer, then the received message is an unsolicited message such as a DXC alarm. In this way, unsolicited messages, such as, repetitive DXC alarms, will not disturb the synchronization of expected and unexpected responses used by the DXC test tool 100 as described above with respect to FIGS. 7A–7C.

(c) Repeat (REPEAT)

The REPEAT directive will cause the entire script to be repeated for the number of times specified for all data in the script table. This is part of the 'stability' and 'stress' testing levels, where a script can be repeated multiple times. Note that a particular script file will be repeated for the number of records in the script table. The REPEAT directive causes the script file to loop to the top of the script table and repeat the run using the entire table of data.

A repeat directive has two fields in the following format:

| REPEAT DIRECTIVE | | |
|---|---|---|
| Column Name | Format | Length |
| REPEAT | Alpha | 6 |
| Repeat Number | Numeric | 4 |

REPEAT identifies a Repeat Directive. Repeat Number indicates the number of times the entire script/data table combination should be repeated.

Example

REPEAT 3

(d) Digital Cross Connect (DXC)

The DXC directive specifies which DXC is being tested by this script. The format is DXC;Node Id, where DXC is the directive, and Node Id is the NODE ID designated in the configuration file for the selected DXC.

| DXC DIRECTIVE | | |
|---|---|---|
| Column Name | Format | Length |
| DXC | Alpha | 3 |
| Node Id | Numeric | 4 |

Example

DXC 0001

(e) Data Table Name (TABLENAME)

The TableName directive specifies which data table to use for the substitution data for the currently running script. Each script can only have a single data table open. The format is TABLENAME; Name of Table File, where TABLENAME is the directive, and Name of Table File is the name of the file containing data for the current script. The extension, .TBL, is not used as part of the table name in the directive, however, it is part of the actual file name.

| TABLENAME DIRECTIVE | | |
|---|---|---|
| Column Name | Format | Length |
| TABLENAME | Alpha | 9 |
| Name of Table File | AlphaNumeric | 12 |

Example

TABLENAME table 1

(f) Channel (CH)

A Channel (CH) directive is also used as a form of repeat command. In A link and the channels on that link to be tested are defined in the CH directive. A CH directive will repeat a script file but, if there is a range for channels, will change the channel number used during each iteration. The CH directive has three fields (CH, Link, Channels). Each field is separated by a semicolon (';') and has the following format:

| CH DIRECTIVE | | |
|---|---|---|
| Column Name | Format | Length |
| CH | Alpha | 2 |
| Link | Alpha | 1 |
| Channels | AlphaNumeric | 5 |

CH is the channel directive. Link designates the communication link, where A=the first port on an X.25 communication card, B=the second port on an X.25 communication card, and C=the RS-232 port. Channels identifies the number, or range, of channels used on the selected link. Channels are synonymous with sessions. The channels may be a single number or range separated by a hyphen. The range for the channels 1–11, however, keep in mind that the current total number of channels on a link for an Alcatel DXC is 5, and the current total for a DSC 3/3 or 3/1 DXC is 4. The 11 channels refers to a DSC 1/0 DXC. The number of channels for an RS-232 link will be 8.

Example

CH;A;1–3

(2) Description Line

The Description Line can contain up to 54 characters to describe the function of the script. It must be the very first line in the script file, and it must start with a '*', which designates a comment. This description will be displayed on the Script Selection display 1300.

Example

*Test successive GRTH commands (3) SEND/RECEIVE Record

The SEND/RECEIVE records in the script detail the command being sent out, the expected response, and the different actions to take for specific circumstances. There are two (2) message types: ASCII messages, which include (but are not limited to) the TL1 and PDS messages, and Binary messages. The format for Send/Receive lines is critical for proper execution and are shown in table below. Each parameter field, including the last, must be followed by a semicolon (;).

SEND/RECEIVE DIRECTIVE

| Column Name | Format | Length |
|---|---|---|
| *InputCommand | AlphaNumeric | (Message Length) |
| ASCII/Binary | Alpha | 1 |
| *Delay | Numeric | 3 |
|  | MM:SS | 5 |
| *MsgType | Numeric | 1 |
| *Action | Alpha | 10 |
| *FieldN | Numeric | 3 |
| *ExpectedResponseN | AlphaNumeric | (Message Length) |

*These fields are used when interpreting the original script format.

The SEND/RECEIVE records can have a New Format or original Formats as follows:

New format (ASCII or Binary):
InputCommand;ASCII/Binary;Delay;MsgType;Action;Field1;ExpectedResponse;[Field2;ExpectedResponse2; . . . ;FieldN;ExpectedResponseN;]

Original format (ASCII only):
InputCommand;ASCII/Binary;Delay;MsgType(For PDS only);Action;Field1;ExpectedResponse1; [Field2;ExpectedResponse2; . . . ;FieldN;ExpectedResponseN;]

The fields in a SEND/RECEIVE record includes the following information:

Input Command includes any valid ASCII or Binary command 100. For TL1, the optional CTAG field must contain the string "ctag". The DXC test tool 100 will substitute a distinct value in this field when issuing the command. This allows the tool 100 to distinguish responses to script commands from other messages issued by the DXC 180. The Binary messages will be in a 2-byte encoded ASCII format rather than the actual Binary message. This allows the message to be human-readable. So instead of having to type in the actual Binary command and response like this: °§((Æ, the user will be able to enter the encoded ASCII command: 010700001001.

ASCII/Binary determines whether to convert the command to a Binary format or leave in the ASCII format. For positive tests, all ASCII messages (currently TL1 and PDS) will be "A", and Binary messages will be "B". Negative tests can be run by changing these. If the field is not included, DXC test tool 100 will read the script in its original format.

Delay represents the length of time the DXC test tool 100 will wait before looking for a response from the DXC 180. There are two formats for this field: number of seconds, with valid entries from 0 to 255 (4 minutes, 15 seconds); or MM:SS, with valid entries for minutes (MM) from 0–99, and valid entries for seconds (SS) 0 to 59. Any value without the colon (':') will be used as total number of seconds.

MsgType is used only for PDS script records in the original tool. In the new format, it is used for all message types. Valid entries are:

0—Normal response. This parameter is generally used on single-line responses. For example, a single PDS response ends with a COMPL or DNY.

1—Extended response. This parameter is generally used on mutli-line responses. For example, a multi-line PDS response may contain multiple COMPLs or DNYs. For this type of message, the presence of a single COMPL or DNY indicates receipt of a valid response, but does not terminate the read. A binary response may contain multiple message lines or possibly multiple messages in response to a single command. The program continues to look for additional text until no characters have been received for about 25 seconds.

A script entry for a binary command has a 0 in the last nibble of a specific byte, indicating that it is the final line of a multi-line response. Identifying this value in the field offset parameter (FieldN) will expedite execution of the next script command by not automatically starting the 25 second timer.

For any ASCII or binary message where it's impossible to specify a unique string or value for determining the final response line, the field value should be set to 0 and the expected response (ExpectedResponseN) set to NULL by using 2 semicolons (';') with no space between them.
example: . . . ;0;;

2—Exceptional response. This parameter value is only used in the original script processing, and only for certain PDS messages. A PDS response may not contain either a COPL or DNY anywhere in the response. In this case, the program accepts text until no characters are received for 25 seconds, regardless of whether a COMPL or DNY has been received or not.

Action identifies action to be taken if the response to the command is incorrect, as indicated by the MsgType parameter. If the MsgType parameter is set to 0, and the expected response (ExpectedResponseN) is not found, or the timer expires, the following actions will be taken:

c—continue with the next script line j—jump to a label in the file. "j" must be followed directly by the label, e.g., jLabel1 h—halt further execution of the current script file. Execution will resume with the next elected script file.

a—abort execution of this script file and any others that are scheduled.

Field1 . . . FieldN are the fields in a response to be examined. The fields for TL1 responses are given in Bellcore GR-833-CORE (incorporated herein by reference). PDS responses follow a similar but less structured format. In the original format, a zero in the MsgType parameter means to ignore the field offset (FieldN) parameter and search for the entire expected response. A one in the MsgType parameter means use the field offset to locate the expected response value in the actual response line. In the new format, a zero in the MsgType parameter will cause the processing to scan the entire response line for the specified expected response.

The Binary responses will be in the actual binary format and can be checked by starting nibble position relative to 1. Each ASCII-encoded position (byte) represents a nibble (where 2 nibbles in binary format equal 1 byte). For example, the binary KEEPALIVE response 010800100001 would need the field offset (FieldN) to be 1, and the expected results (ExpectedValueN) to be 0108 to determine that the final response was received. A binary nibble (a single ASCII-encoded position) would be any single number in the response.

ExpectedValue1 . . . ExpectedValueN is the value expected to appear in Field1 . . . FieldN.

(4) CENTEST Commands

The CENTEST 650 commands in the script detail the type of testing/monitoring to be performed via the CENTEST 650 equipment. These commands must start with a "!". The commands consist of parameters that allow the test tool to determine the type of process to be performed, and the menu level to traverse to the CENTEST 650.

!MON xxxxxxxxxxxx

!TEST xxxxxxxxxxxx (5) LABEL

Labels are used to control the execution order of lines in the script file. In one example, a label appears on a line by itself and the first character in the line is ":". These labels are used for the 'jump' parameter in the SEND/RECEIVE line, and can be a maximum of 8 characters.

(6) Comment

A comment line is used for information only; it is ignored when the file is run. The first character on a Comment line is "*".

(7) Substitution

When entering the messages in the SEND/RECEIVE line, the following convention may be used to enter standard values:

<HH:MM:SS> may be added to fill in the current time,

<YY:MM:DD> may be added to fill in the current date,

<SEQ###> may be added to fill in the sequence number. The sequence number starts at one and is incremented by one. Once the sequence number reaches 32,000, it will be reset to one.

These substitutions are not to be confused with inserting substitutions from the data table.

Figure 18A:
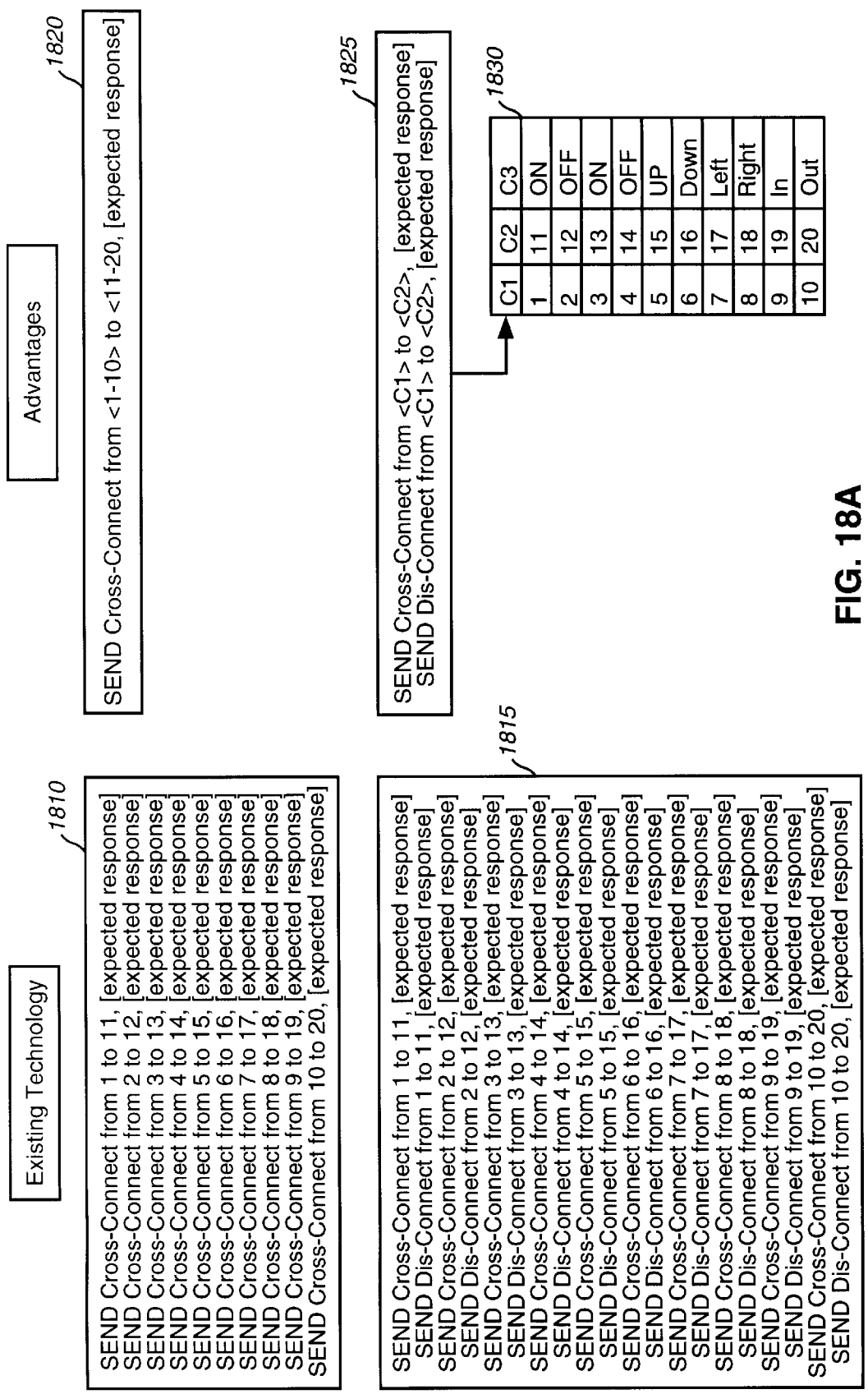
FIGS. 18A and 18B show a comparison of conventional-script records and script records according to the present invention.
Figure 18B:
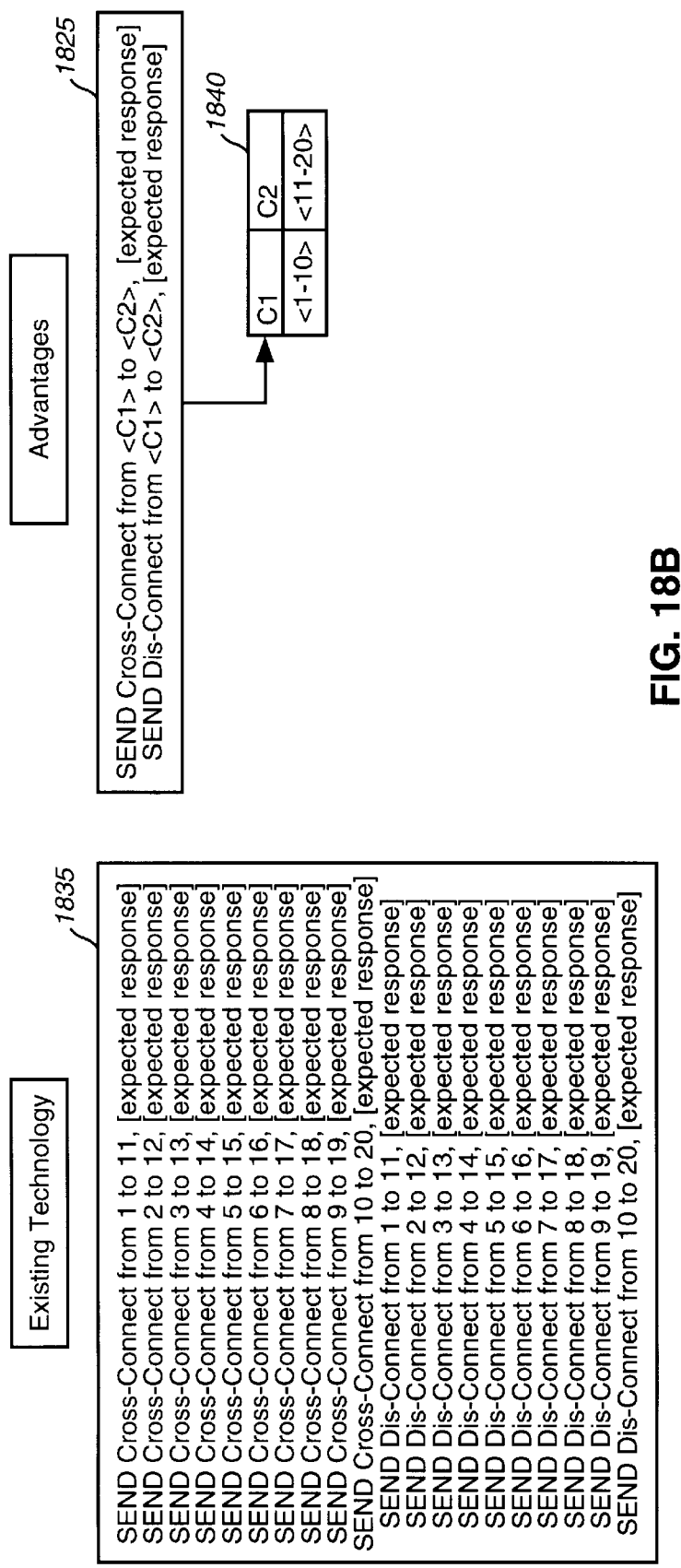

FIG. 18A and FIG. 18B show the economy and reduction of lines required to form a script record according to the present invention. To logically connect 10 ports in existing test tool systems, 10 separate cross-connect commands must be sent as shown in script segment 1810. In the present invention, a single send cross-connect command 1820 having port ranges 1–10 and 11–20 is used.

The use of pointers to tables also economizes the number of lines in a script. In conventional test tools, 20 lines of script are required to send cross-connect and disconnect commands between 10 ports as shown in code segment 1815. In the present invention, two lines of script 1825 are required. One send cross-connect command includes pointers C1–C2 to identify tabular column entries for each of the ports 1–10 and 11–20. One disconnect command in the script segment 1825 includes tabular pointers pointing to tabular entries C1 and C2 in table 1830. Script message processor 300 then will interpret the send cross-connect commands in script 1825 and trace pointers to table 1830 to determine the port ranges.

FIG. 18B shows a further feature of the present invention where the tables are shortened by specifying port ranges as table entries. In this example, the existing technology would require 10 cross-connect commands to connect ports 1–10 and to disconnect ports 1–10. In the present invention, two lines of script are required. One send cross-connect command identifies a table entry C1 to table entry C2. One disconnect command likewise identifies a table entry C1 to a table entry C2. Table 1840 includes table entries C1 and C2. Table 1840, however, unlike table 1830 discussed above, includes port ranges as entry values. Thus, the pointer C1 references a range 1–10 and the pointer C2 references a range 11–20.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer testing system for testing at least one digital cross connect device (DXC), comprising:

a DXC test tool; and at least one test and monitor unit (TMU), said DXC test tool being coupled to each DXC and to each TMU; wherein:

said DXC test tool sends a logical command for placing said at least one DXC in a known state;

said at least one TMU tests the physical presence of said known state in said at least one DXC and sends a response to said DXC test tool indicating whether said known state is present; whereby, said DXC test tool can test each DXC in physical and logical dimensions.

2. The system of claim 1, further comprising:

a plurality of communication links; wherein said DXC test tool further comprises a plurality of ports coupled to said plurality of communication links respectively.

3. The system of claim 2, wherein:

said plurality of communication links include at least one fast channel link and at least one human readable link, and said plurality of ports include at least one fast channel port coupled to respective fast channel links and at least one human readable port coupled to respective human readable links.

4. The system of claim 3, further comprising:

at least one fast channel communication link router coupled between said DXC test tool and each DXC for expanding the number of fast channel links; and at least one human readable communication link router coupled between said DXC test tool and each DXC for expanding the number of human readable links.

5. The system of claim 4, wherein each fast channel link comprises an X.25 link for carrying at least one of binary messages and human-readable messages, and each fast channel communication link router comprises an X.25 synchronous interface router.

6. The system of claim 4, wherein each human readable link comprises a serial RS-232 link for carrying ASCII messages, and each human readable communication link router comprises a RS-232 asynchronous interface router.

7. The system of claim 2, wherein:

said plurality of communication links include at least one remote communication link for communicating with a remote control unit, and said plurality of ports include at least one network port coupled to said at least one remote communication link.

8. The system of claim 7, wherein each at least one remote communication link comprises at least one of an RS-232 link, a Netbios link, and an internet link for carrying at least one of Transmission Control Protocol and Internet Protocol data messages.

9. The system of claim 3, wherein said DXC test tool comprises:
   a communication interface coupled to said plurality of ports, said communication interface passes between an intelligent processor and said ports;
   a user interface;
   a database interface for managing data files; and
   said intelligent processor coupled to each of said communication interface, user interface, and data base interface; wherein said intelligent processor comprises:
      a script message processor for processing a script;
      a control link servicer for servicing each link of said plurality of communication links through a communications interface;
      a user interface servicer for servicing said user-interface to detect user inputs and provide output for display;
      a database servicer for servicing said database interface;
      a message generator for generating messages based on said data files;
      a link selector means for selecting one of said plurality of communication links to carry messages generated by said message generator; and
      a simulated multi-task controller switching the control of said intelligent processor between said script message processor, control link servicer, user interface servicer, and database interface servicer in a pseudo-parallel fashion simulating multi-tasking.

10. The system of claim 9, wherein said data files comprise at least one of a script, communication trace log, analysis log, summary log, initial device configuration file, single message configuration file, and diagnostic report.

11. The system of claim 1, wherein said DXC test tool sends a plurality of logical cross-connect commands defining a network path through at least two DXCs; said at least one TMU tests the physical presence of said network path through said at least two DXCs and sends a response to said DXC test tool indicating whether said network path is in said known state; whereby, said DXC test tool can perform end-to-end path testing in physical and logical dimensions.

12. The system of claim 1, further comprising:
   a memory;
   wherein said DXC test tool stores expected DXC responses that will be sent by said at least one DXC in response to logical cross-connect commands sent by said DXC test tool, wherein said DXC test tool compares actual DXC responses to said expected DXC responses stored in said memory and generates an analysis log of unexpected DXC responses.

13. The system of claim 12, wherein said DXC test tool generates a communication log of all messages that are sent to and from said DXC test tool, and wherein said DXC test tool includes a timestamp for each message in said analysis log and said communication log.

14. The system of claim 13, wherein said communication log and said analysis log are each comprised of records having data fields; whereby, a user can filter said communication log and said analysis log to screen selected records and data fields.

15. The system of claim 12, wherein said DXC test tool further includes unexpected responses sent by said at least one TMU in said analysis log.

16. The system of claim 1, further comprising:
   a script database for storing at least one script, each script defines a testing scenario for the at least one DXC.

17. The system of claim 16, wherein a script includes at least one script directive.

18. The system of claim 17, wherein said at least one script directive includes at least one of a dynamic send directive, a dynamic receive directive, a repeat directive, and a channel directive.

19. The system of claim 17, further comprising a script processor; wherein said script processor automatically repeats a logical cross-connect command in a script for each value in a range of values or for each entry in a table of entries; whereby, the number of lines in a script is reduced.

20. The system of claim 16, wherein said DXC tool processes multiple scripts substantially in parallel.

21. The system of claim 1, wherein said DXC test tool includes a single message display option for selecting between sending ASCII messages and sending binary messages.

22. The system of claim 1, further comprising a run script display means that permits a user to dynamically and interactively execute at least one selected line of a script.

23. A computer-implemented testing method for testing at least one digital cross connect device (DXC), using a DXC test tool and a test and monitor unit (TMU), comprising:
   sending a logical command from the DXC test tool for placing at least one DXC in a known state;
   testing the physical presence of said known state in the at least one DXC; and
   sending a response to the DXC test tool indicating whether said known state is present; whereby, the DXC test tool can test each DXC in physical and logical dimensions.

24. A computer program product comprising a computer useable medium having computer program logic recorded thereon for enabling a processor in a computer system to test at least one digital cross connect device (DXC) with at least one test and monitor unit (TMU), said computer program logic comprising:
   means for enabling the processor to send a logical command for placing at least one DXC in a known state; and
   means for enabling the processor to receive a response from the at least one TMU indicating whether said at least one DXC is physically in said known state, whereby, the processor can test each DXC in physical and logical dimensions.

* * * * *